(12) United States Patent
Kajiyama et al.

(10) Patent No.: US 7,082,004 B2
(45) Date of Patent: Jul. 25, 2006

(54) DISK STORAGE SYSTEMS

(75) Inventors: Shinya Kajiyama, Tachikawa (JP);
Hiroyasu Yoshizawa, Ome (JP);
Yoichiro Kobayashi, Ome (JP); Ichiro Somada, Hamura (JP)

(73) Assignee: Hitachi, Ltd., Tokyo (JP)

( * ) Notice: Subject to any disclaimer, the term of this patent is extended or adjusted under 35 U.S.C. 154(b) by 47 days.

(21) Appl. No.: 11/033,258

(22) Filed: Jan. 12, 2005

(65) Prior Publication Data
US 2005/0180041 A1 Aug. 18, 2005

(30) Foreign Application Priority Data
Feb. 18, 2004 (JP) .............................. 2004-040782
Oct. 29, 2004 (JP) .............................. 2004-315003

(51) Int. Cl.
*G11B 5/09* (2006.01)
(52) U.S. Cl. .......................................... 360/46; 360/67
(58) Field of Classification Search ................. 360/46,
360/67, 31, 66, 39, 55, 75; 330/292; 324/252;
327/54
See application file for complete search history.

(56) References Cited

U.S. PATENT DOCUMENTS

| | | | | |
|---|---|---|---|---|
| 5,834,952 | A * | 11/1998 | Ngo .............................. | 327/54 |
| 5,914,630 | A * | 6/1999 | Peterson ..................... | 327/513 |
| 5,969,523 | A * | 10/1999 | Chung et al. ............... | 324/252 |
| 6,054,901 | A * | 4/2000 | Nainar et al. ................ | 330/292 |
| 6,175,462 | B1 * | 1/2001 | Chung et al. ................. | 360/67 |
| 6,252,735 | B1 * | 6/2001 | Chung et al. ................. | 360/67 |
| 6,331,921 | B1 * | 12/2001 | Davis et al. ................... | 360/67 |
| 6,341,046 | B1 * | 1/2002 | Peterson ....................... | 360/67 |
| 6,349,007 | B1 * | 2/2002 | Jiang ............................. | 360/31 |
| 6,404,579 | B1 * | 6/2002 | Ranmuthu et al. ............ | 360/66 |
| 6,532,127 | B1 * | 3/2003 | Ranmuthu et al. ............ | 360/66 |
| 6,583,946 | B1 * | 6/2003 | Emerson ....................... | 360/66 |

(Continued)

FOREIGN PATENT DOCUMENTS

| | | |
|---|---|---|
| JP | 2001-209901 | 1/2000 |
| JP | 2003-069352 | 8/2001 |

OTHER PUBLICATIONS

Zheng, Zhiliang et al., "A 0.55nV/√Hz Gigabit Fully-Differential CMOS Preamplifier for MR/GMR Read Application", 2002 IEEE International Solid-State Circuits Conference, Session 3/Digital Processors and Circuits/3.7, 3 pages.

(Continued)

*Primary Examiner*—Fred F. Tzeng
(74) *Attorney, Agent, or Firm*—Reed Smith LLP; Stanley P. Fisher, Esq.; Juan Carlos A. Marquez, Esq.

(57) ABSTRACT

The present invention provides a disk storage system with a low error rate, which is suitable for reduction in size. The other end of the signal line, which is connected with a read head at one end, is connected with a head bias circuit to apply a sense current to the read head and a pair of first and second capacitance elements for allowing the read signal element formed by the read head to pass, a loop is provided for amplifying the read signal obtained through the first and second capacitance elements by supplying the read signal to an input terminal of a differential amplifying circuit and for converting the amplified signal into the current by transconductance and providing a positive feedback of the amplified signal to the input terminal of the differential amplifying circuit.

16 Claims, 17 Drawing Sheets

U.S. PATENT DOCUMENTS

| | | | |
|---|---|---|---|
| 6,724,551 B1* | 4/2004 | Ranmuthu | 360/31 |
| 6,724,556 B1* | 4/2004 | Ranmuthu et al. | 360/66 |
| 6,822,817 B1* | 11/2004 | Chung et al. | 360/46 |
| 2003/0193731 A1* | 10/2003 | Choi | 360/66 |
| 2005/0141119 A1* | 6/2005 | Takeuchi et al. | 360/66 |
| 2005/0168860 A1* | 8/2005 | Gleason et al. | 360/67 |

OTHER PUBLICATIONS

Veenstra, Hugo et al., "A 16b/s Read/Write-Preamplifier for Hard-Disk-Drive Applications", 2001 IEEE International Solid-State Circuits Conference, Session 12/Signal Processing for Storage and Coding/12.5, 3 pages.

* cited by examiner

DISK STORAGE SYSTEMS

CLAIM OF PRIORITY

The present application claims priority from Japanese application JP 2004-040782 filed on Feb. 18, 2004, and Japanese application JP 2004-315003 filed on Oct. 29, 2004, the contents of which are hereby incorporated by reference into this application.

FIELD OF THE INVENTION

The present invention relates to a disk storage system, particularly to a storage system utilizing perpendicular recording and also to a technology which may be effectively utilized into a disk storage system using, for example, a magnetoresistive effect element as a read head.

BACKGROUND OF THE INVENTION

In the field of HDD (Hard Disk Driver), development of highly sensitive head for data reading has been continued and the TMR (Tunneling Magneto-Resistive) head and CPP-(GMR (Current Perpendicular to Plane Giant Magneto-Resistive) head are listed as the typical examples of the head for the next generation. As an example of a read amplifier for amplifying the signals of GMR read head, a circuit illustrated in FIG. 10 has been proposed in the Non-Patent Document 1.

Moreover, in the field of the HDD, efforts have been made for improvement in area density and the perpendicular recording for magnetizing media in the perpendicular direction will be put into practical use in near future. A read amplifier for amplifying the signals from the read head for perpendicular recording has been disclosed, for example, in the Non-patent Document 2.

[Non-Patent Document 1]
"A 0.55 nV/√Hz Gigabit Fully-Differential CMOS Preamplifier for MR/GMR Read Application" ISSCC Digest of Technical Papers, pp. 64–65, February 2002.

[Non-Patent Document 2]
"A 1 Gb/s Read/Write Preamplifier for Hard-Disk-Drive Application", Digest of technical paper of ISSCC 2001, 2001, 00. 188–189.

SUMMARY OF THE INVENTION

However, the read heads such as TMR and CPP-GMR heads called the head for the next generation described above show considerable variations in resistance ($R_{mr}$) having the values, for example, too large or too small value. The read head connected with a preamplifier through signal line to receive supply of the sense current and to form fine signal with a magneto-resistive effect. In the case of amplifying this fine signal with the preamplifier, it is assumed difficult, when considering a large variation of head resistance ($R_{mr}$) as described above, to attain the matching between the head as a signal source and a characteristic impedance $Z_O$ of the signal lines. Therefore, it is important to realize matching between the input impedance $Z_{in}$ and the characteristic impedance $Z_O$ in the side of preamplifier. In other words, noise characteristic of a read amplifier is important for realization of low error rate as the HDD apparatus. Accordingly, the inventors of the present invention have reached the result that the low noise input termination method is very important.

Moreover, it is also required to realize the preamplifier within an IC for reduction in size of the HDD apparatus. For this purpose, it is essential to also comprise within the IC a coupling capacitance element for extracting only the fine signal formed by the read head. However, since the capacitance element requires an IC chip area and if a capacitance value is large, the signal transmission band is influenced thereby because a parasitic capacitance also becomes large, it is desirable to realize the desired high-pass cut-off frequency fcl with the capacitance value as smaller as possible. Therefore, the inventors of the present invention have proposed a preamplifier circuit system which requires only small capacitance value for the high-pass frequency and is comprised in the IC.

Namely, an ordinary resistance termination becomes a loss for the grounding, resulting in increases in noise. But, termination by shunt feedback for feeding back an output to the input via a resistance is known as the low noise termination method.

In the preamplifier of FIG. 10, an input impedance is lowered by introducing a shunt feedback structure for feeding back an output to the input via the resistors Rb1, Rb2 to determine a potential of the node in the amplifier side of the coupling capacitors C1, C2. However, in order to realize a cut-off frequency fcl as low as several MHz, the resistance values of the resistors Rb1, Rb2 are large and the signal line of about 60Ω is not matched and cannot be matched with the input impedance $Z_{in}$. In addition, when it is attempted to attain the matching, in the preamplifier of FIG. 10, between the input impedance Zin and the impedance of signal line, the capacitance values of the coupling capacitors C1, C2 must be large in order to realize the cut-off frequency of several MHz which is required by the HDD apparatus. Accordingly, realization of such cut-off frequency fcl by the capacitance element comprised in the IC becomes difficult. For instance, following formula (1) and formula (2) can be established in the preamplifier of FIG. 10. In the formulae (1) and (2), the coupling capacitors C1 and C2 are expressed as Cc, while $R_{in}$ indicates a differential input resistor.

$$\text{Formula (1)}: fcl = \frac{1}{2\pi \cdot \frac{Rin}{2} \cdot Cc}$$

$$\text{Formula (2)}: Cc = \frac{1}{2\pi \cdot \frac{Rin}{2} \cdot fcl} = \frac{1}{2\pi \cdot 30 \cdot 1M} = 0.16\mu F$$

When it is attempted to attain the matching with the input impedance (the characteristic impedance $Z_O$ of the transmission line is usually about 60Ωdiff), two differential capacitance elements (0.16 μF×2) are required from the formulae (1) and (2) to obtain the cut-off frequency fcl of 1 MHz. However, it is difficult to build these capacitance elements into the IC. Therefore, it can be said impossible, in the preamplifier circuit of FIG. 10, to simultaneously realize matching of the characteristic impedance with the input impedance $Z_{in}$ and lower cut off frequency fcl.

On the other hand, in the perpendicular recording system, the reproduced signal from the read head includes a low frequency element in comparison with the conventional longitudinal recording system. In the case where this low frequency signal is amplified with a preamplifier in order to obtain high S/N, the high-pass cut off frequency must be lowered because the preamplifier has the high-pass characteristic to amplify only the AC signal element by eliminating a DC bias element of the head. Therefore, increase in the capacitance value to realize high-pass characteristic is a solution for reduction of this high-pass cut off frequency. However, since this capacitance must be comprised in the preamplifier IC, if the capacitance value is increased from the restriction of chip area, the amplifier bandwidth is deteriorated due to parasitic capacitance. Accordingly, it is important to lower the high-pass cut off frequency using a capacitor having a value which is identical to the conventional preamplifier for longitudinal recording through a certain means, in place of lowering the high-pass cut off frequency by simply increasing the value of capacitor from the restriction of bandwidth. Moreover, the inventors have reached the result that the method for lowering the high-pass cut-off frequency without increase in the value of capacitor is very important for reduction in size of the HDD apparatus. Usually, the high-pass cut off frequency fcl of the read amplifier having a high input impedance in which the shunt feedback is no effective may be determined with the formula (3) in accordance with the $r_\pi$ and capacitance values of C1 and C2 in FIG. 1.

$$\text{Formual (3)}: fcl = \frac{1}{2\pi \cdot r\pi \cdot C}$$

Here, C or $r_\pi$ must be increased to lower fcl. However, since $r_\pi$ is determined with the current applied to Q1 and Q2 and a certain amount of current must be applied to lower amplifier noise, $r_\pi$ is determined with restriction of noise. Moreover, since the capacitor must be comprised, a size thereof is restricted by chip area and bandwidth.

Accordingly, a means for effectively increasing a value of $r_\pi$ with a negative resistance has been proposed. A small signal equivalent circuit of FIG. 1 is indicated as illustrated in FIG. 2, the high-pass cut off frequency fcl is determined with the formula (4), and a value of $r_\pi$ can be assumed to be increased effectively by realizing a negative resistance for compensating for the current lost by $r_\pi$ with Gm2.

$$\text{Formula (4)}: fcl = \frac{1}{2\pi \cdot \frac{1}{(1/r\pi) - Gm1 \cdot Gm2 \cdot RL} \cdot CHP}$$

For instance, fcl becomes infinite 0 and comes close to the direct current by adequately selecting a value of Gm2.

For instance, the negative feedback to the input from the output by Q7, Q8, R3, R4 in FIG. 1 is the shunt feedback for matching the input impedance to the characteristic impedance of the signal line transmission line and is known as a method for attaining input impedance matching of low noise with an input resistance termination using the negative feedback. With this matching method, high frequency bandwidth can be expanded. For instance, in the read amplifier disclosed in the non-patent document 2, since fcl is determined with $r_\pi$ and C, it is impossible to approximate fcl to the DC with adjustment of design parameters.

It is an object of the present invention to provide a disk storage system which as realized low error rate.

It is another object of the present invention is to provide a disk storage system which is suitable for reduction in size.

The above-described and the other objects and novel features of the present invention will become apparent from description of the present specification and the accompanying drawings thereof.

According to a profile of the present invention, the other end of the signal line which is connected with a read head at one end is connected with a head bias circuit to apply a sense current to the read head and a pair of first and second capacitance elements for allowing the read signal element formed by the read head to pass, a loop is provided for amplifying the read signal obtained through the first and second capacitance elements by supplying the read signal to an input terminal of a differential amplifying circuit and for positive feedback of the amplified signal to the amplifier side of the first and second capacitance elements through conversion into the current.

According to the more practical profile, the disk storage system of the present invention comprises a read head, a signal line connected to both ends of the read head at its one end, and a amplifying circuit which is provided at the other end of the signal line to amplify and output the read signal formed by the read head. In this disk storage system, the amplifying circuit is provided with a head bias circuit electrically connected to the other end of the signal line to apply a sense current to the head, a pair of first and second capacitance elements connected electrically to the other end of the signal line to allow the signal element of the read signal formed by the read head to pass, a differential amplifying element to receive at the input terminal thereof the read signal having passed the first and second capacitance elements, a transconductance circuit for converting the read signal amplified with the differential amplifying element into the current, and a positive feedback loop for feeding back the read signal converted to the current with the transconductance circuit to the input terminal of the differential amplifying element.

According to the other profile of the present invention, the other end of the signal line connected with a read head at one end thereof is provided with a bias circuit and a pair of first and second capacitance elements to allow the read signal element formed by the read head to pass, the read signal having passed the first and second capacitance elements is supplied to an input terminal of a differential amplifying circuit, an AC feedback loop including a first resistance element, a third capacitance element, a second resistance element, and a fourth capacitance element for negatively feeding back the amplified signal to the input terminal of the differential amplifying circuit is also provided. The bias circuit may be a head bias circuit for applying the sense current to the read head or may be a bias voltage circuit for applying the bias voltage to the read head.

According to the present invention, the chip area of the preamplifier IC for HDD may be reduced and thereby HDD apparatus can be reduced in size.

DETAILED DESCRIPTION OF THE PREFERRED EMBODIMENTS

Figure 1:
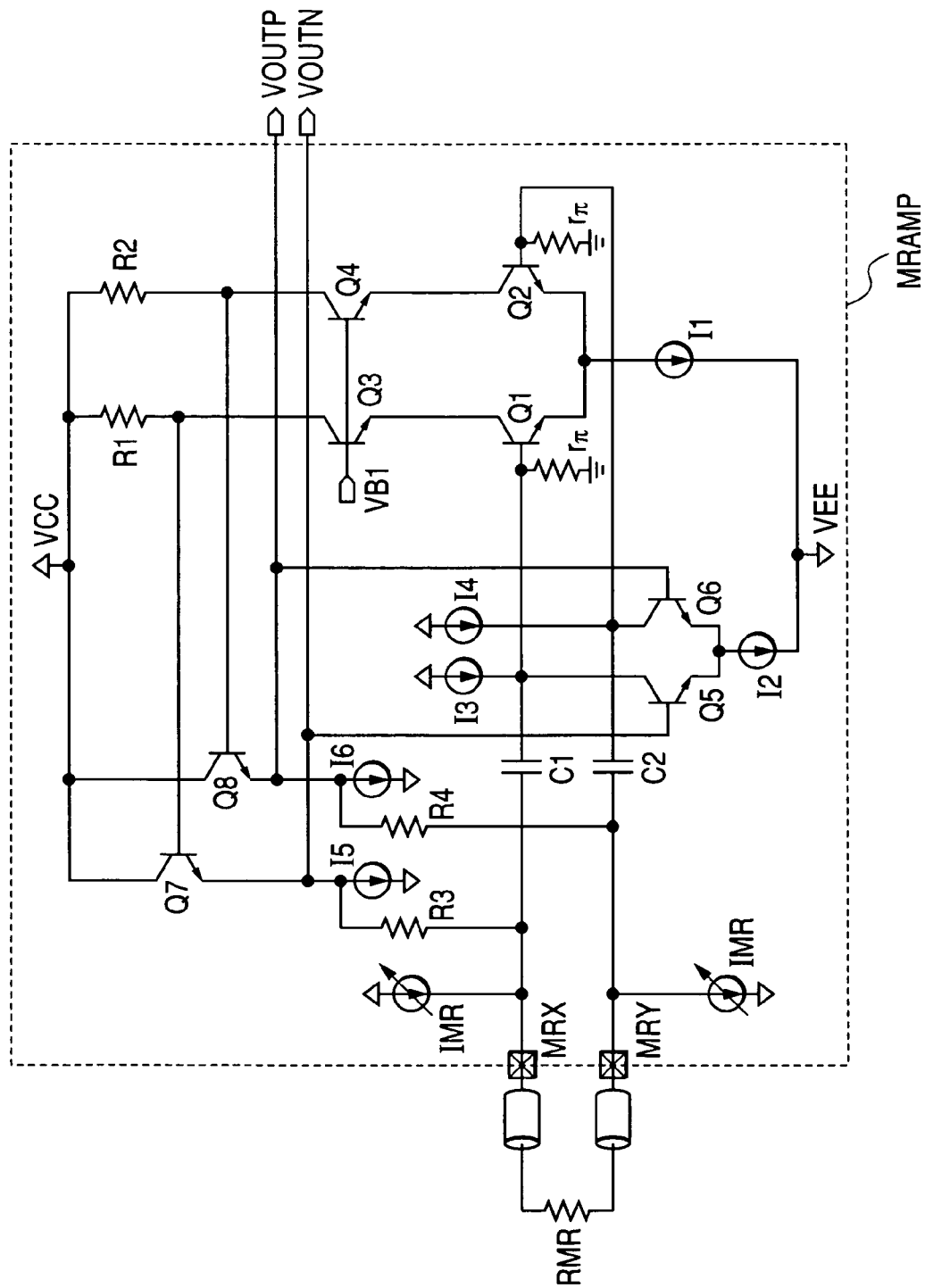
FIG. 1 is a circuit diagram illustrating an embodiment of a read preamplifier of a disk storage system of the present invention.

FIG. 1 is a circuit diagram of an embodiment of a read preamplifier of the disk storage system of the present invention. A resistance RMR is a read head including various kinds of heads well known such as the perpendicular recording and GMR (Giant Magneto-Resistive) type or the like. Both ends of the read head RMR are connected to one end of a pair of signal lines and the other end of these signal lines is connected to input terminals MRX and MRY of a preamplifier. Such input terminals MRX, MRY are connected with a current source IMR as a bias circuit included in the preamplifier. The bias circuit is formed of a pushing current source IMR and a pulling current source IMR and the sense current (IMR) is applied to the read head RMR through the signal lines. These pushing and pulling current sources IMRs are formed of a variable current source to set the sense current in accordance with fluctuation in the resistance RMR of the read head. In the MR head, resistance value changes depending on the magnetic field and therefore the voltage signal can be extracted as ΔR×IMR (ΔR is a change in resistance due to a magnetic field).

The input terminals MRX and MRY of the sense amplifier are connected to one electrodes of coupling capacitors C1 and C2. The other electrodes of the coupling capacitors C1 and C2 are connected to the bases of the NPN type differential transistors Q1 and Q2. A resistance $r_\pi$ connected to the bases of these differential transistors Q1 and Q2 indicates an input parasitic resistance. A tail current source I1 is provided between the coupled emitters of the differential transistors Q1 and Q2 and a power supply voltage VEE in the low potential side. Load resistances R1 and R2 are provided between the collectors of the differential transistors Q1 and Q2 and the power supply voltage VCC in the high potential side. Although not particularly restricted, the transistors Q3 and Q4 are provided between the transistors Q1, Q2 and the resistances R1, R2. A bias voltage VB1 is supplied to the bases of these transistors Q3 and Q4. These transistors Q3, Q4 form a common base cascode for reducing Cjc Miller capacitance of the transistors Q1, Q2 and it is desirable to provide these transistors for realization of broadband.

In the preamplifier of this embodiment, a negative resistance is introduced for positive feedback of an amplifier output through conversion into current with a transconductor. The transconductor may be realized with transistors Q5, Q6 and current sources I3, I4. Namely, a negative resistance is realized to raise an input resistance of transistors Q1, Q2 by compensating for current loss due to $r_\pi$ with the current by the transconductor.

In this embodiment, although not particularly restricted, the amplified signal obtained from the collectors of the transistors Q1, Q2 performs impedance matching through the negative feedback with a structure that an emitter follower output circuit consisting of the NPN transistors Q7, Q8 and current sources I5, I6 is provided and the emitters of the output transistors Q5, Q6 forming such emitter follower circuit are connected, in one hand, to the output terminals VOUTP and VOUTN, while, in other hand, to the feedback resistances R3, R4 to realize the shunt feedback. With input termination using this shunt feedback, low noise input impedance matching can be realized.

In this embodiment, the part enclosed by a dotted line in FIG. 1 forms an amplifying circuit MRAMP (so-called preamplifier) and each circuit element within this frame of dotted line is integrated into a single semiconductor chip (preamplifier IC).

Figure 2:
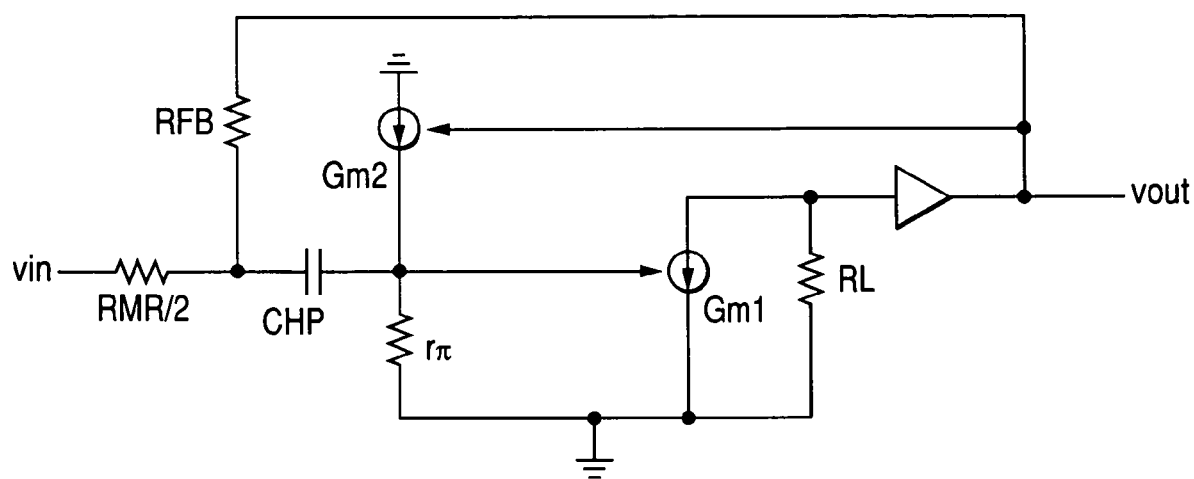
FIG. 2 is a simplified equivalent circuit diagram for describing operations of the preamplifier of FIG. 1.

FIG. 2 is a small signal equivalent circuit for describing operations of the preamplifier of FIG. 1. In FIG. 2, transconductance of Q1, Q2 is indicated as Gm1, load resistance value of R1, R2 as RL, coupling capacitance of C1, C2 as CHP, feedback resistance R3, R4 of shunt feedback as RFB, and transconductance of Q5, Q6 as Gm2. An emitter follower realized by Q7, 15, Q8, and 16 is indicated as a triangular buffer. The positive feedback current by Gm2 effectively makes large a value of $r_\pi$ by compensating for current loss by $r_\pi$. The shunt feedback by RFB realizes matching of the amplifier input impedance.

According to this embodiment, a capacitance value for high-pass frequency can be reduced with a negative resistance for positive feedback of current. Therefore, chip area of the semiconductor integrated circuit loading a preamplifier can be reduced. Moreover, since a parasitic capacitance is also reduced when a built-in capacitance of the semiconductor integrated circuit is reduced, broad frequency band may be realized. Since chip area may be reduced through reduction of built-in capacitance, cost of the IC including the preamplifier can be lowered. Moreover, the built-in high-pass capacitance must be charged or discharged during the mode switching of write-to-read. However, in the present invention, since the capacitance value may be reduced, the write-to-read time can also be reduced, resulting in reduction in the idling time of the HDD apparatus.

Figure 3:
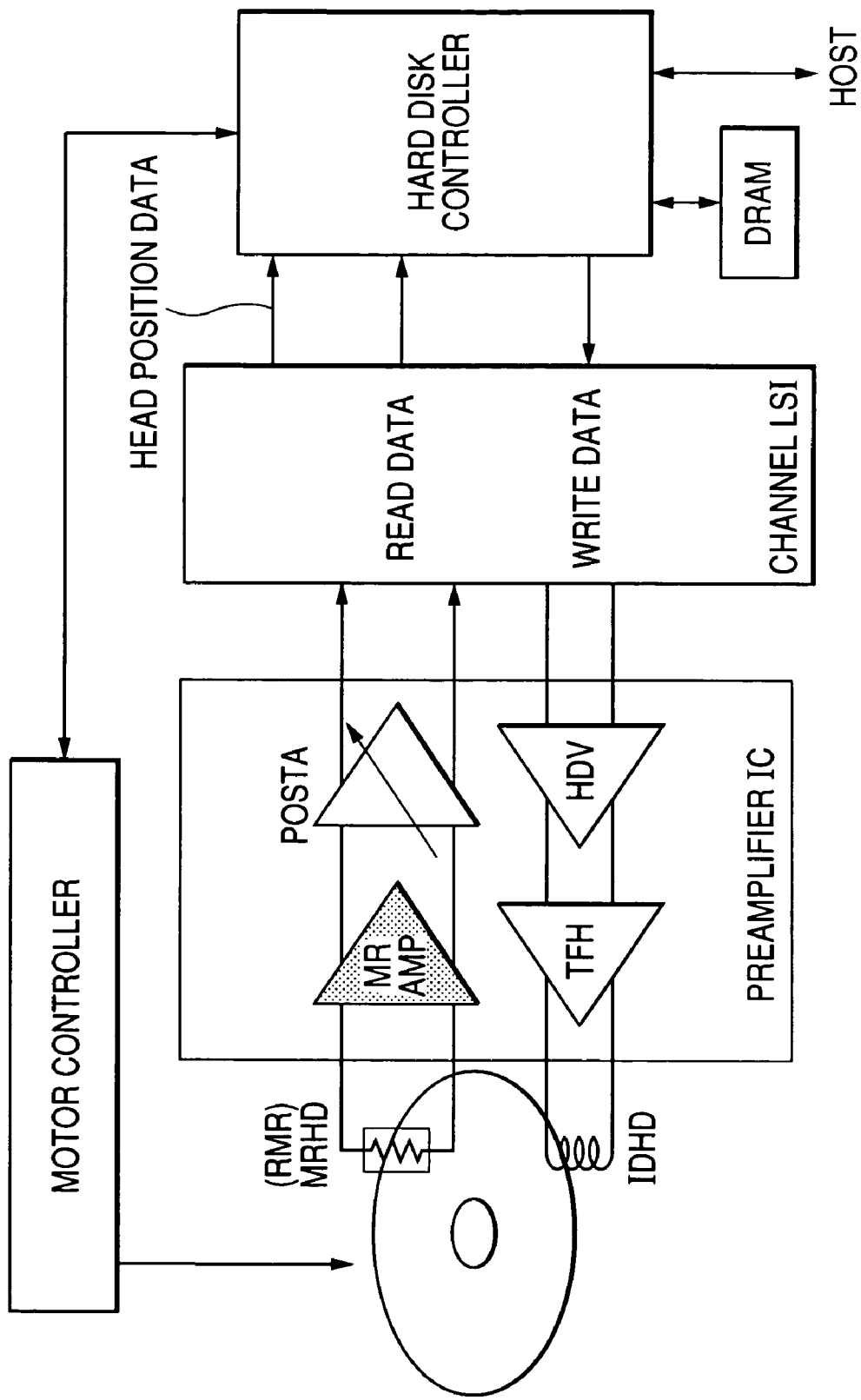
FIG. 3 is a schematic total block diagram of the embodiment of the disk storage system of the present invention.

FIG. 3 is a schematic total block diagram of an embodiment of the disk storage system of the present invention. The disk storage system of the present invention is constituted to comprise a preamplifier IC (read/write IC) for sending and receiving the read/write signal to and from a read head MRHD (corresponding to RMR in FIG. 1) to execute reproduction corresponding to the perpendicular recording system for recording to multiple disks (only one typical disk is illustrated in FIG. 1) respectively having the magnetic recording surfaces corresponding to the perpendicular recording system, a channel LSI (signal processing LSI) for sending and receiving signal to and from the read/write IC, and a motor control circuit consisting of a hard disk controller, a memory DRAM (Dynamic Random Access Memory) for storing write data and read data, a disk driver for rotatably driving multiple disks having the magnetic recording surfaces, and a servo/spindle motor controller.

The preamplifier IC mounts multiple circuits (number of disks×2) of write driver TFH provided corresponding to a write inductive head INHD corresponding to the perpendicular recording system for recording to multiple disks and read circuit MRAMP (so-called preamplifier) provided corresponding to a read head MRHD corresponding to the perpendicular recording system for reproduction. Each of multiple read circuits MRAMP has a circuit structure in any of the frames of dotted line in FIG. 1, and FIGS. 4 to 8. Although not illustrated, it is suitable for the preamplifier IC that various control circuits for generation of sense current, and bias setting for detecting selection signal and irregular operations of element and head such as the servo circuit and head selection or the like are also integrated thereto.

The bias circuit (not illustrated) to generate the sense current generates a sense current supplied to the read head MRHD and also supplies a bias voltage to a fault detecting circuit. A temperature detecting circuit detects, although not particularly restricted, large amplitude signal when a perpendicular recording head is in contact when the recording surface and eliminates influence of temperature rise appearing on output of the preamplifier MRAMP. A pair of output signals from the preamplifier MRAMP is amplified, although not particularly restricted, with a postamplifier POSTA for variable gain. An output of the postamplifier POSTA is waveform-shaped with a waveform shaping circuit included in the signal processing circuit of the channel LSI and is then transferred as the read data pulse signal to a host circuit of the HDD controller or the like by a pulse-forming circuit. A head driver HDV drives, in the write mode instructed from the channel LSI, the inductive head INHD via the write driver TFH corresponding to the write data. Both or any of these postamplifier POSTA and head driver HDV is preferably integrated on a single preamplifier IC together with both or any of the preamplifier MAAMP and write driver TFH.

The disk storage system of this embodiment is constituted to comprise multiple disks as the recording media, a motor for driving these disks, multiple MR heads for respectively reading the magnetically stored information stored to both surfaces of each disk, multiple read/write chips respectively providing multiple read amplifiers MRAMP provided corresponding to the MR heads, post amplifiers AMP, write magnetic (inductive) heads, and write drivers TFH for driving these write heads, a control and signal processing LSI for sending and receiving signals to and from the read/write chips, and an HDD controller as the interface with a host apparatus.

The disk is mounted, although not particularly restricted, to a common rotating shaft which is rotated at its center with the motor and since the ground potential is applied to the rotating shaft, potential of the storage surfaces of multiple disks is grounded. A structure that one read amplifier, a post signal amplifying circuit corresponding to the read amplifier and a write driver are respectively provided to multiple read/write chips provided corresponding to both surfaces of multiple disks as described above is considered as the following mounting profile of chip. That is, high sensitivity and high frequency band amplifying operation is realized by allocating adjacently the read/write chip to a composite head consisting of the MR head and inductive head IND and then minimizing signal loss when a minute signal is transferred using a comparatively longer signal transmission path from the MR head.

Multiple disks are concentrically coupled keeping a constant interval through the rotating shaft. One arm extends to the two disk surfaces provided oppositely and the composite head is respectively in contact with both surfaces because it is branched by a suspension arm. The head is in contact with the disk surface when the disk is in the stationary condition. However, when the disk is rotating at a high speed, the disk is a little floated keeping a minute gap owing to the air flow generated by rotation of disk. The read/write operation is executed under the condition that the head is floated over the disk surface.

As will be described later, the read/write chip is mounted to the end point side of arm, namely to the suspension arm mounting part. Accordingly, the signal wire between the read/write chip and head, in other words, between the MR head and read amplifier and between the inductive head and write driver can be shortened corresponding to the length of suspension arm. Accordingly, the high sensitive and wideband operations may be realized by minimizing the factors which attenuate signals such as parasitic resistance and parasitic inductance elements appearing on the signal lines.

The HDD control chip for operations to select only one head from multiple heads and the signal processing LSI are mounted in the other end point side of the arm. A comparatively longer distance may be provided between the HDD control chip and read/write chip corresponding to the length of arm but since the read/write chip is provided, signal loss in this chip may be neglected because the signal element thereof considerably large.

According to this embodiment, since the low high-pass cut off frequency corresponding to the perpendicular recording may be realized without increase in the capacitance of the built-in capacitor of the preamplifier IC forming the disk storage system, the chip area of the preamplifier IC can be reduced by using this preamplifier. Moreover, reduction in size of disk storage system such as the HDD apparatus of the perpendicular recording system can be realized.

Figure 4:
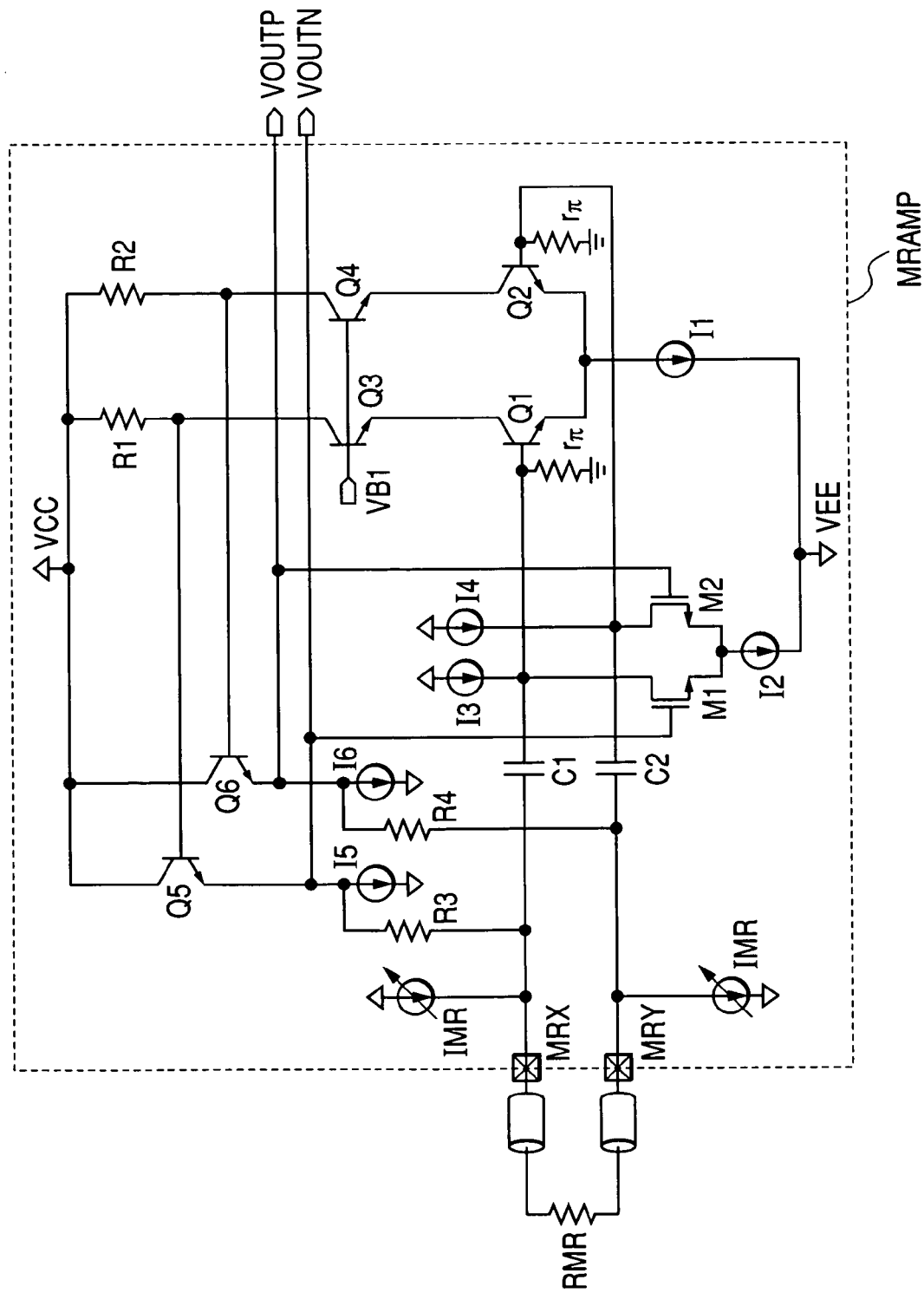
FIG. 4 is a circuit diagram of another embodiment of the read preamplifier of the disk storage system of the present invention.

FIG. 4 is a circuit diagram of another embodiment of the read preamplifier of the disk storage system of the present invention. In this embodiment, the transconductor in FIG. 1 is replaced with NMOS FETM 1 to 2 and mutual connections of circuit elements conform to the embodiment of FIG. 1. Circuit operations of this embodiment can naturally be described like that of the embodiment of FIG. 1 with reference to the small signal equivalent circuit of FIG. 2. This embodiment can provide the effect, because of use of NMOSFET as the transconductor, that the current of the current source I2 to realize Gm2 within the optimum range can be increased to a certain degree and thereby accuracy of I2 and Gm2 can also be acquired. A current in the adequate range for canceling $r_\pi$ must be supplied to the bases of differential amplifying elements Q1, Q2. The reason is that if this current is too large, an excessive output of the differential amplifying elements Q1 and Q2 is fed back to the input, resulting in the possibility of erroneous operation such as unwanted oscillation. This base current may be suppressed to lower level by reducing the current of the current source I2 connected to the common source of the transconductors M1, M2. However, if I2 is reduced excessively, it is difficult to acquire the accuracy of I2 and Gm2. When the NMOSFET is used as the transconductor like this embodiment, if I2 is large, the base current of Q1 and Q2 can be suppressed to a certain extent. Accordingly, accuracy of I2 and Gm2 can be acquired by increasing I2.

Figure 5:
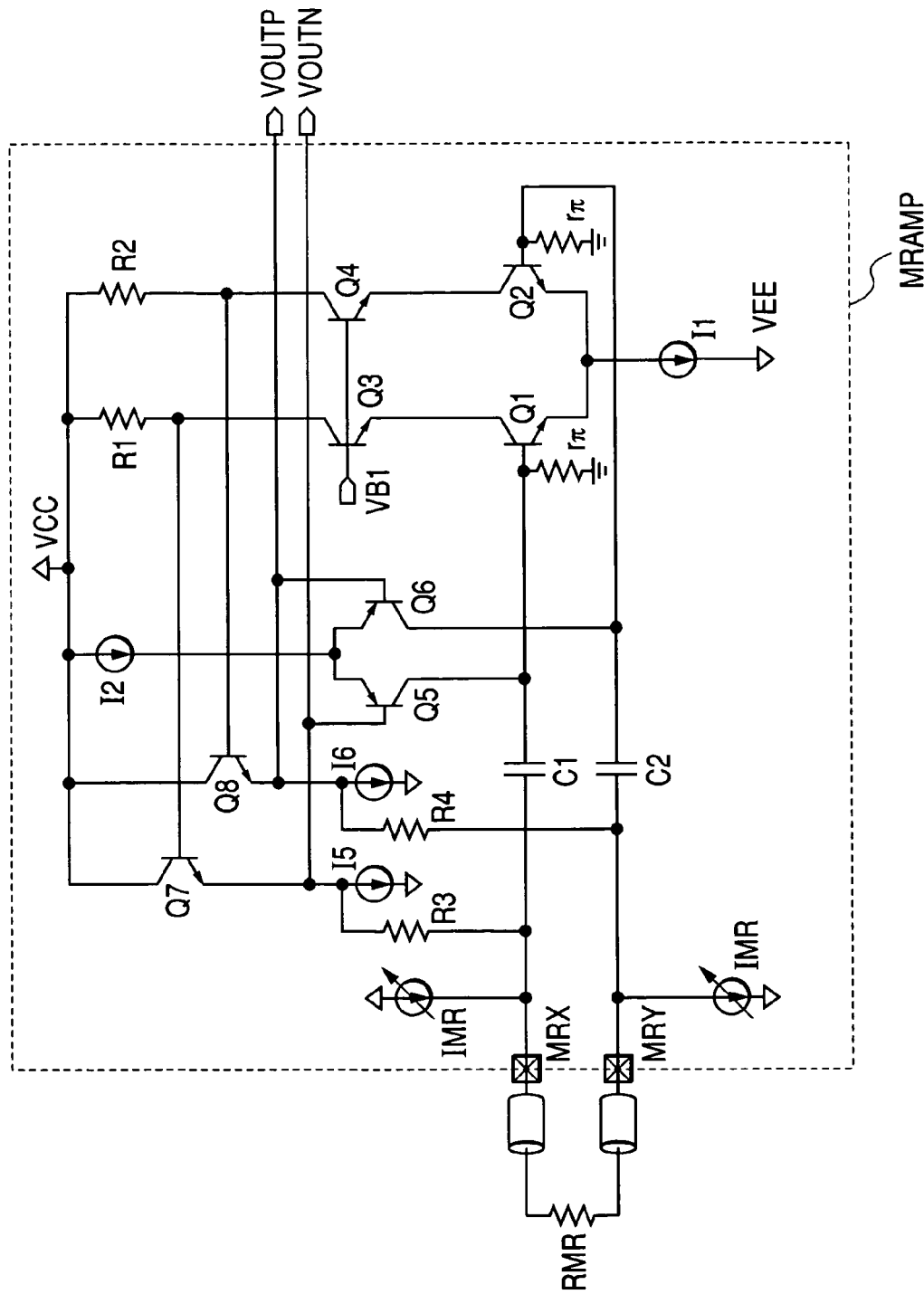
FIG. 5 a circuit diagram of the other embodiment of the read preamaplifier of the disk storage system of the present invention.

FIG. 5 is a circuit diagram of another embodiment of the read preamplifier of the disk storage system of the present invention. In this embodiment, the transconductor in FIG. 1 is replaced with the PNP bipolar transistors Q5, Q6. Mutual connections of circuit elements conform to that of the embodiment of FIG. 1. Circuit operations of this embodiment can naturally be described like that of the embodiment of FIG. 1 with reference to the small signal equivalent circuit of FIG. 2.

This embodiment provides the effect, because of use of PNP bipolar transistor as the transconductor, that the preamplifier IC chip area can be reduced through elimination of the current sources I3, I4 in FIG. 1 and FIG. 5, only by adding a means (not illustrated) for determining the base potential of Q1 and Q2 in FIG. 1 and FIG. 4.

Figure 6:
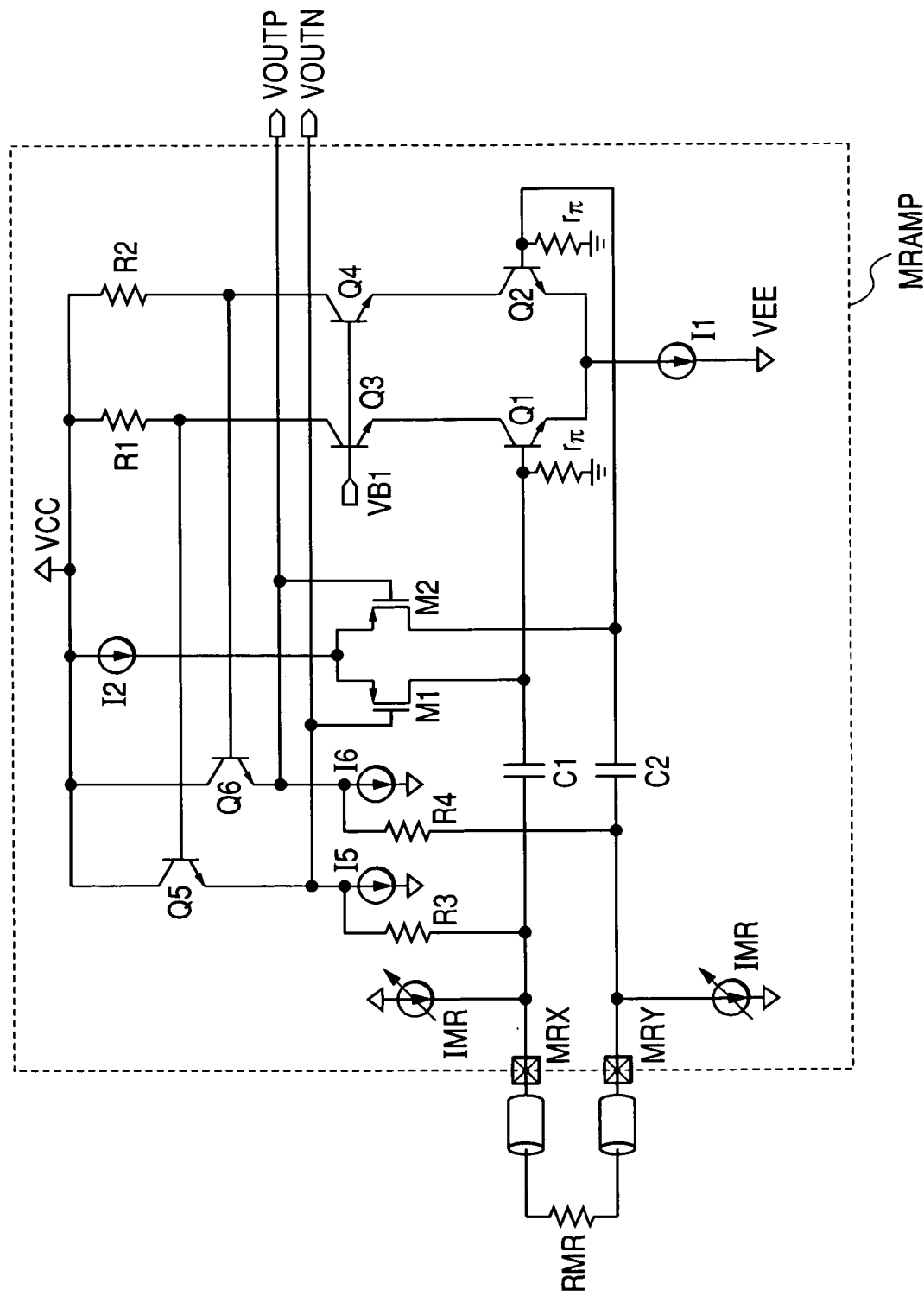
FIG. 6 is a circuit diagram of the other embodiment of the read preamplifier of the disk storage system of the present invention.

FIG. 6 is a circuit diagram of another embodiment of the read preamplifier of the disk storage system of the present invention. In this embodiment, the transconductor in FIG. 1 is replaced with the PMOSFET M1 to 2. Mutual connections of circuit elements conform to that of in the embodiment of FIG. 1. Circuit operations of this embodiment can be described like that in the embodiment of FIG. 1 with reference to the small signal equivalent circuit of FIG. 2.

This embodiment provides the effect, because of use of PMOSFET as the transconductor, that the area of preamplifier IC can be saved through elimination of the current sources I3, I4 in FIG. 1 and FIG. 4 only by adding a means (not illustrated) for determining the base potential of Q1 and Q2 in FIG. 1 and FIG. 4. Additional effect of this embodiment is that this embodiment can also be adapted to the BiCMOS process that does not include PNP bipolar transistors.

Figure 7:
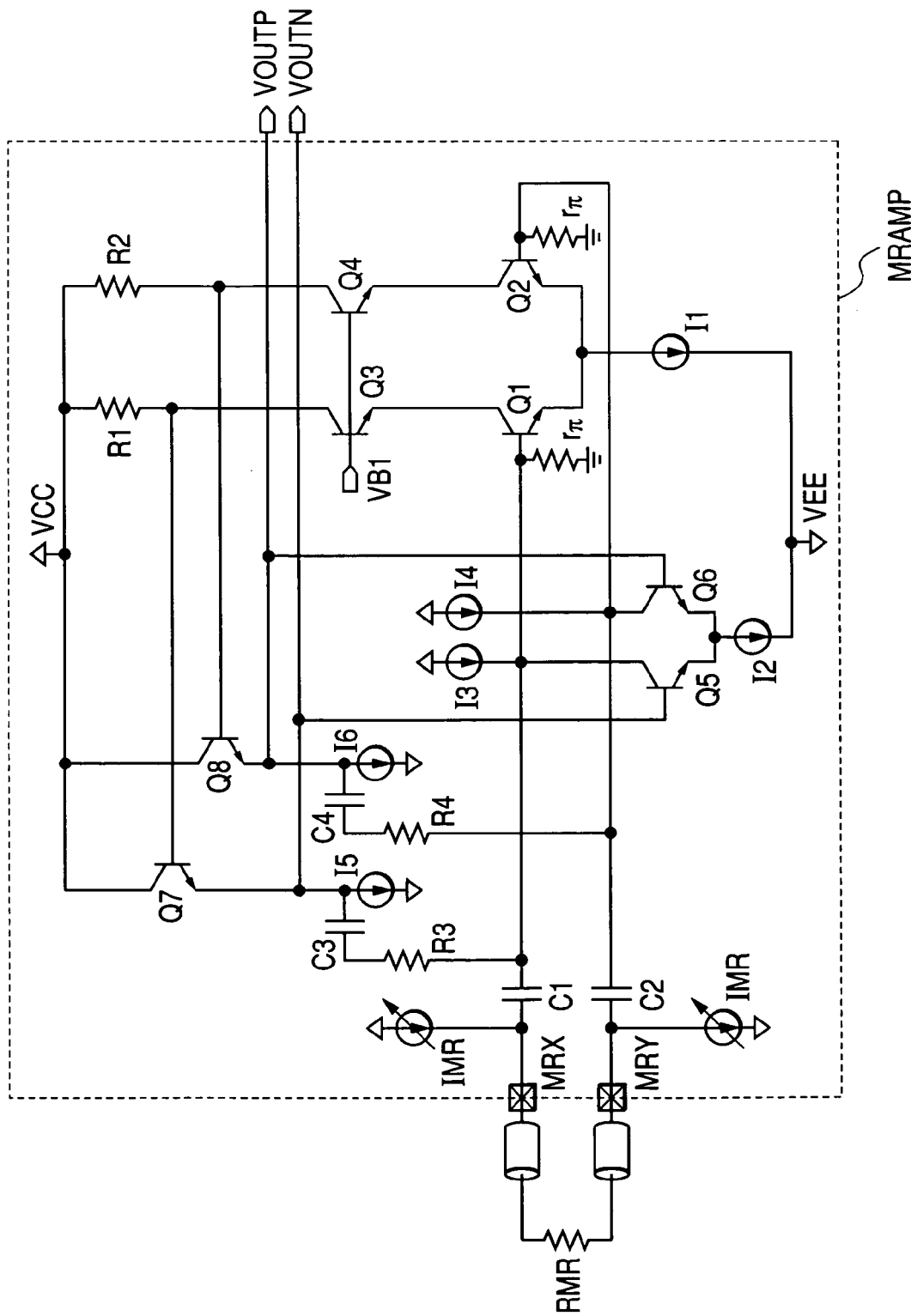
FIG. 7 is a structure diagram of the other embodiment of the read preamplifier of the disk storage system of the present invention.

FIG. 7 is a circuit diagram of another embodiment of the read preamplifier of the disk storage system of the present invention. This embodiment introduces the AC feedback for the shunt feedback for the input impedance matching in FIG. 1 and conforms to the embodiment of FIG. 1 in the connections of circuit elements. Circuit operations of this embodiment can naturally be described like that of the embodiment of FIG. 1 with reference to the small signal equivalent circuit of FIG. 2.

In this embodiment, the amplified signal obtained from the collectors of the transistors Q1 and Q2 is applied to an emitter follower output circuit consisting of the NPN transistors Q7, Q8 and current sources I5, I6 and the emitters of the output transistors Q5, Q6 forming such emitter follower circuit are connected, in one hand, to the output terminals VOUTP and VOUTN and also connected, in the other hand, to the feedback capacitances C3, C4 for cutting off the DC element for conducting the AC element. The other end of the feedback capacitances C3 and C4 is connected to the feedback resistances R3, R4. Thereby, the shunt feedback is realized for the AC element to conduct input impedance matching through the negative feedback. With the input termination using this shunt feedback, low noise input impedance matching can be performed.

As the bias system of the MR head, a current bias system for setting the current applied to the head (current bias) and a voltage bias system for setting the voltage applied to the head (voltage bias) have been proposed. In the case of the shunt feedback of FIG. 1, application of the voltage bias is more suitable because current from R3 and R4 competes with IMR. Meanwhile, in the case of shunt feedback of FIG. 7, application of both voltage bias and current bias are suitable because C3 and C4 are provided to give negative feedback to the amplifier side of the C1 and C2 as the AC feedback and thereby the path of IMR and the shunt feedback path can be cut for the DC element with C1 and C2 without reduction of $r_\pi$ for the DC element with the shunt feedback.

Figure 8:
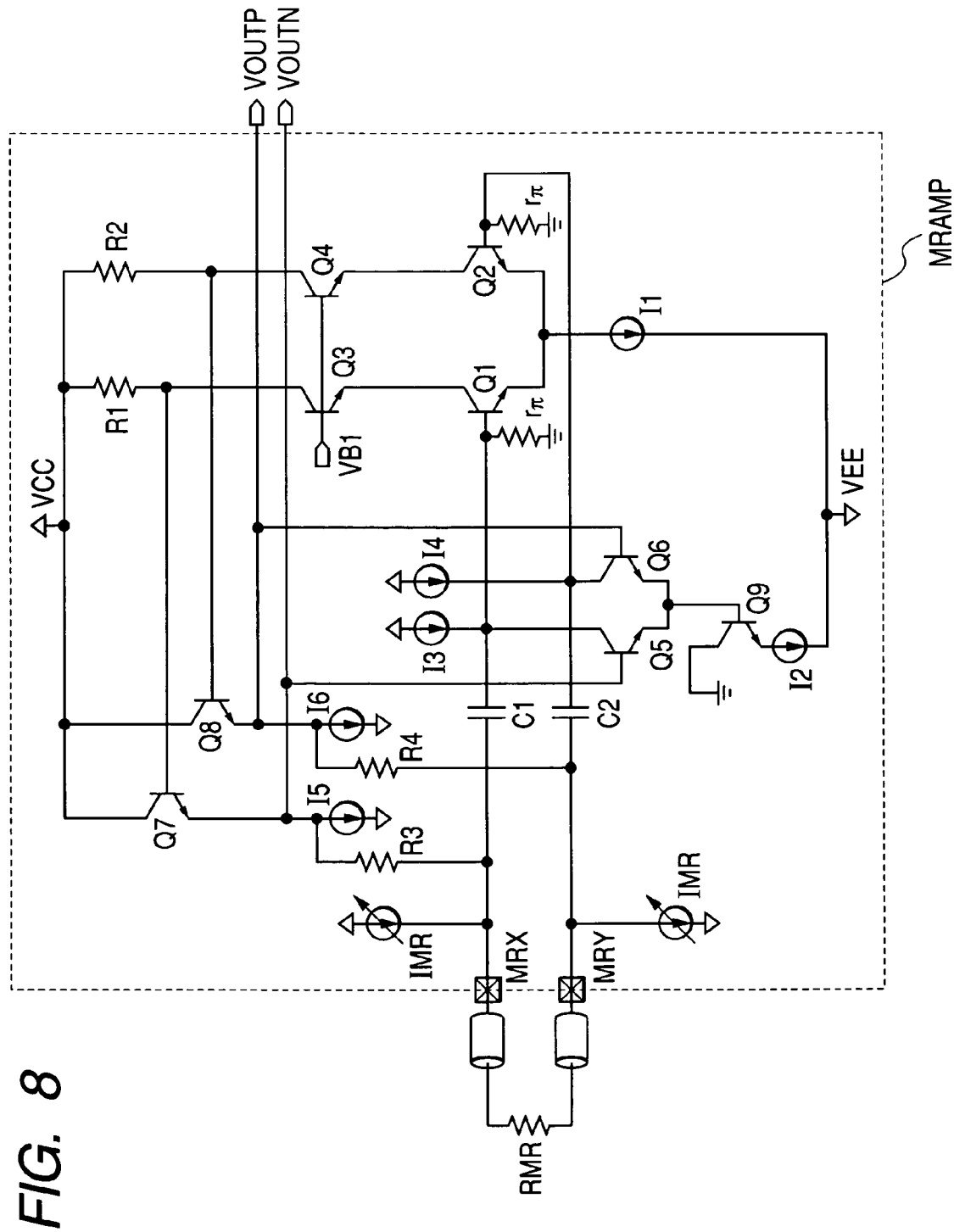
FIG. 8 is a structure diagram of the other embodiment of the read preamplifier of the disk storage system of the present invention.

FIG. 8 is a circuit diagram of another embodiment of the read preamplifier of the disk storage system in the present invention. In this embodiment, the current source I2 connected to the common emitter of the transconductor in FIG. 1 is replaced with the base current of the bipolar transistor Q9 which is biased with a constant current. Mutual connections of circuit elements conform to that of the embodiment of FIG. 1. Circuit operations of this embodiment can naturally be described like that of the embodiment in FIG. 1 with reference to the small current equivalent circuit of FIG. 2.

From the formula (4), the high-pass cut off frequency of the read amplifier is determined with relationship among $r_\pi$, Gm1, Gm2, and RL but since $r_\pi$ is proportional to the current amplification factor $h_{FE}$ of bipolar transistor, fluctuation in manufacture becomes large. Accordingly, when Gm2 is realized with a lower current, the denominator of the formula (4) becomes less than 0 due to the fluctuation in manufacture of $h_{FE}$ and thereby excessive positive feedback occurs, resulting in the possibility of the event that differential output of the read amplifier is kept large and is not returned and that high-pass cut off frequency is not sufficiently reduced, on the contrary, because of shortage of positive negative feedback. Therefore, variation in $r_\pi$ due to fluctuation in manufacture of $h_{FE}$ may be related to Gm2 and thereby fluctuation in manufacture of hFE can be compensated by biasing the transconductance for positive feedback negative resistance with the base current as illustrated in FIG. 8.

Figure 9:
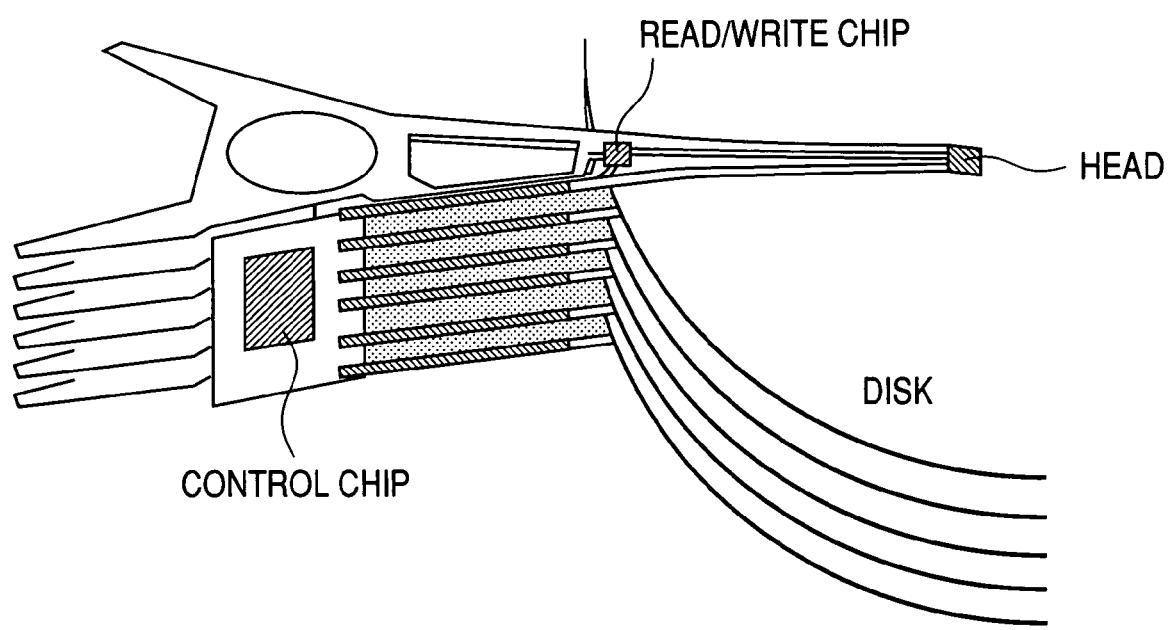
FIG. 9 is a schematic structure diagram of the essential portion of an embodiment of a hard disk drive to which the present invention is applied.

FIG. 9 is a schematic structure diagram of the essential portion of and embodiment of the hard disk drive to which the present invention is adapted. The read/write chip is provided at the root portion of suspension arm as described above. At the end point area of this suspension arm, a perpendicular recording head or a composite head consisting of the MR head and inductive head is provided.

Corresponding to multiple disks, multiple arms and suspension arms coupled in the laminating condition and the control chip utilizes the side surface formed of multiple arms for mounting thereto. On the other hand, the read/write chip mounting the preamplifier is loaded to the mounting part of the suspension arm to reduce the length of signal line to the head. With employment of such mounting profile of the read/write chip and control chip, loss in the signal transmitting path can be minimized to realize high sensitive and wideband read operation and reduction in size of the hard disk drive.

Figure 11:
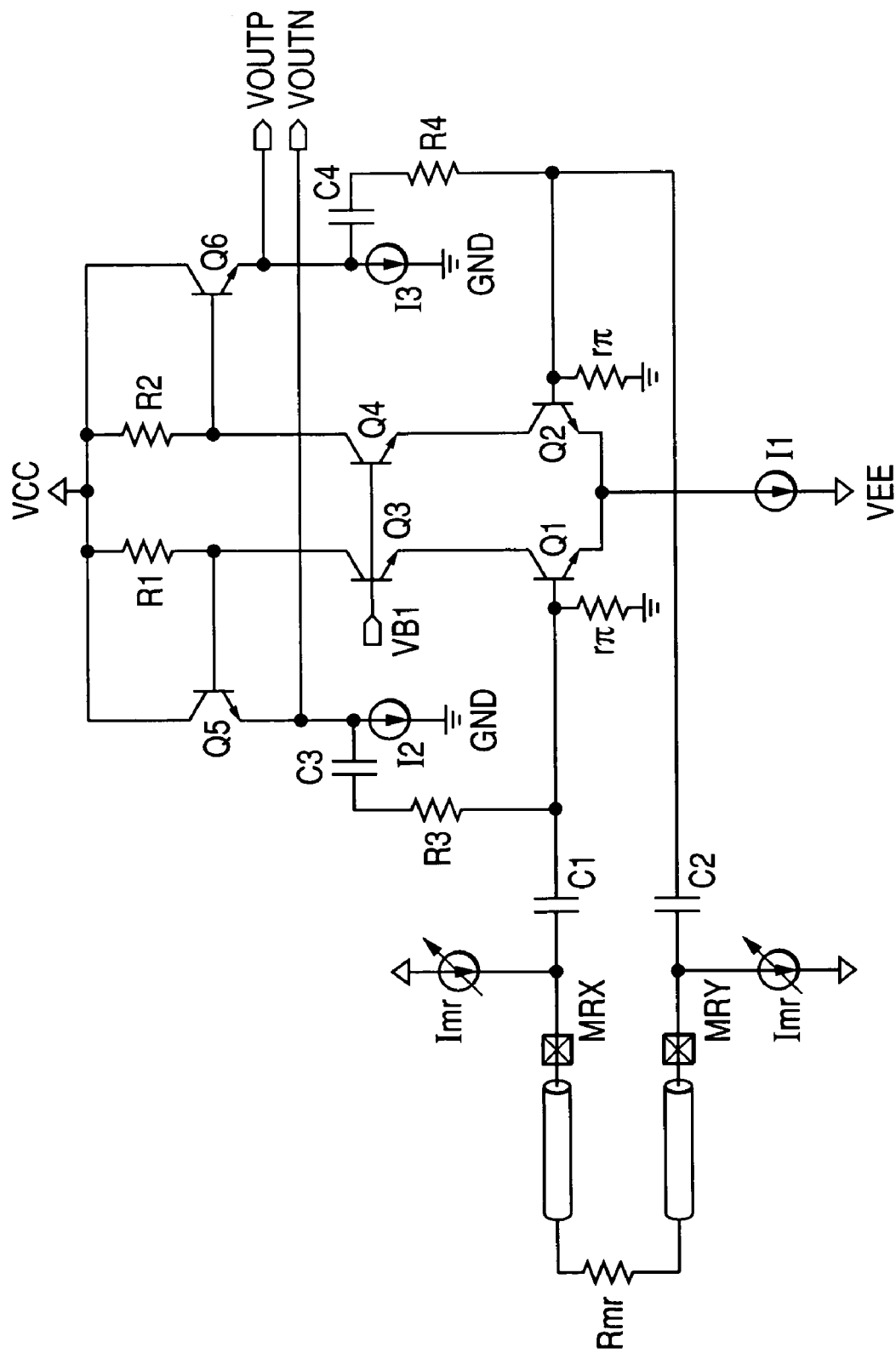
FIG. 11 is a circuit diagram of an embodiment of the read preamplifier of the disk storage system of the present invention.

FIG. 11 is a circuit diagram of another embodiment of the read preamplifier of the disk drive system of the present invention. A high sensitivity read/write head such as GMR (Magneto-Resistive) head, TMR head and CPP-GMR head is represented by resistance $R_{mr}$. Both ends of the read head $R_{mr}$ is connected to the one end of a pair of signal lines and the other end of this signal lines is connected to the input terminals MRX and MRY of the preamplifier. Such input terminals MRX, MRY are connected with the current source $I_{mr}$ as the bias circuit included in the preamplifier. The bias circuit is formed of a pushing current source $I_{mr}$ and a pulling current source $I_{mr}$ and applies a sense current ($I_{mr}$) to the read head $R_{mr}$ through the signal line. These pushing and pulling current sources $I_{mr}$ are formed of variable current sources to set the sense current corresponding to fluctuation in resistance $R_{mr}$ of the read head. In the MR head, since the resistance changes in accordance with the magnetic field, the voltage signal can be extracted as $\Delta R \times I_{mr}$ ($\Delta R$ is change in resistance by the magnetic field). As the other bias method, the voltage bias system is also used, in which the sense current $I_{mr}$ is fed back to make constant the bias voltage to be applied to the read head.

The input terminals MRX and MRY of the sense amplifier are connected to one electrode of the coupling capacitances C1 and C2. The other electrode of the coupling capacitors C1 and C2 is connected to the bases of the NPN differential transistors Q1 and Q2. The resistance $r_\pi$ connected to the bases of these differential transistors Q1 and Q2 indicates an input parasitic resistance. Between the coupled emitters of the differential transistors Q1 and Q2 and the power supply voltage VEE in the low potential side, a tail current source I1 is provided. Between the collectors of the differential transistors Q1 and Q2 and the power supply voltage VCC in the high potential side, load resistances R1 and R2 are provided. Although not particularly restricted, the transistors Q3 and Q4 are provide between the transistors Q1, Q2 and resistances R1, R2. To the bases of the transistors Q3 and Q4, the bias voltage VB1 is supplied. These transistors Q3 and Q4 are common base cascode for reduction of Cjc mirror capacitance of the transistors Q1 and Q2. Therefore, it is preferable to introduce these transistors to realize broadband characteristic.

In the preamplifier of this embodiment, the AC shunt feedback type LNA (Low Noise Amplifier) circuit is used, in which the AC feedback is realized by providing a capacitance to the shunt feedback path. That is, the feedback resistances R3, R4 and the feedback capacitances C3, C4 to realize the shunt feedback are provided between the base as the input side of the transistors Q1, Q2 and the collector as the output side thereof. In this embodiment, although not particularly restricted, the amplified signal obtained from the collectors of transistors Q1 and Q2 is applied to an emitter follower output circuit consisting of the NPN transistors Q5, Q6 and current source I2. The emitters of the output transistors Q5, Q6 forming the emitter follower circuit are connected, in one hand, to the output terminals VOUTP, VOUTN and connected, on the other hand, to the feedback path capacitances C3, C4 to realize the shunt feedback. The emitter follower output circuit consisting of the transistors Q5, Q6 and current sources I2, I3 is provided for buffering of the feedback path. This output circuit is preferably provided for realization of broadband characteristic, but it may also be eliminated considering reduction in power consumption as will be described later.

Figure 10:
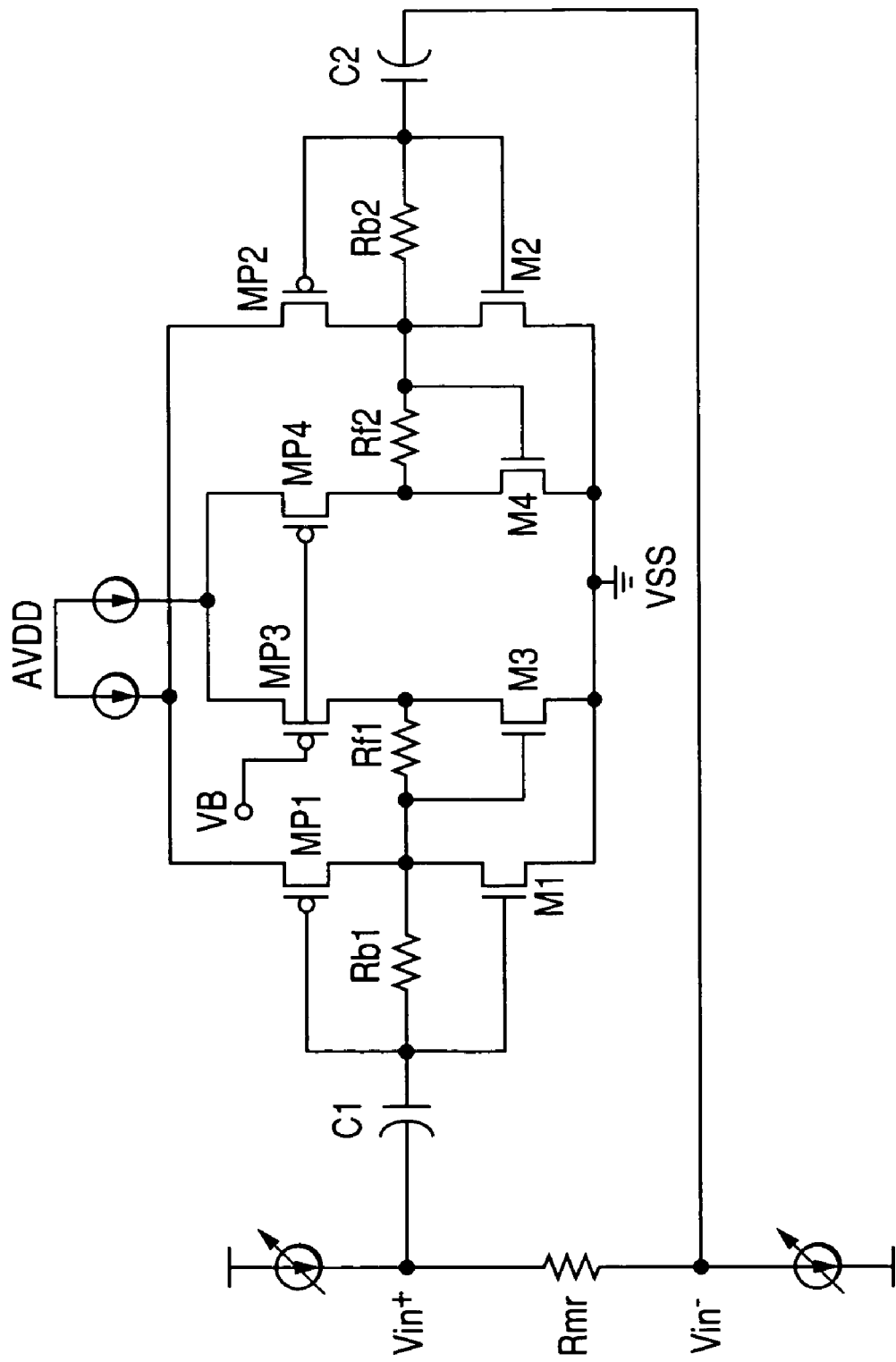
FIG. 10 is a circuit diagram as an example of the conventional read amplifier.

As described above, the ordinary resistance termination to insert a termination resistance between the input terminals MRX and MRY generates a loss for grounding and allows increase of noise. However, the termination by the shunt feedback for negative feedback of an output to the input via the resistance of this embodiment is known as a low noise termination method. However, in the method for negative feedback to the amplifier side of the high-pass capacitances C1, C2 via the resistances Rb1, Rb2 with inclusion of the DC element as illustrated in FIG. 10, the capacitance values of the coupling capacitances C1, C2 become large to realize the cut-off frequency fcl of several MHz required for the HDD apparatus and it becomes difficult to realize such larger capacitance value with the capacitance element comprised in the IC. If such capacitance is comprised in the IC, not only the chip size of IC becomes large but also parasitic capacitance becomes larger, giving influence on the bandwidth for signal transmission. Accordingly, it is difficult to actually introduce this method.

On the other hand, effect of shunt feedback appears from the higher frequency band and the base nodes of the transistors Q1, Q2 has higher impedance $r_\pi$ for the lower frequency band with insertion of the feedback capacitances C3, C4 as in the case of the embodiment of FIG. 11. Thereby, the lower cut off frequency fcl is realized using the coupling capacitances C1, C2 and feedback capacitances C3, C4 having small capacitance values. Simultaneously, low noise matching of Zin which is the characteristic of the shunt feedback termination can also be realized.

Figure 12:
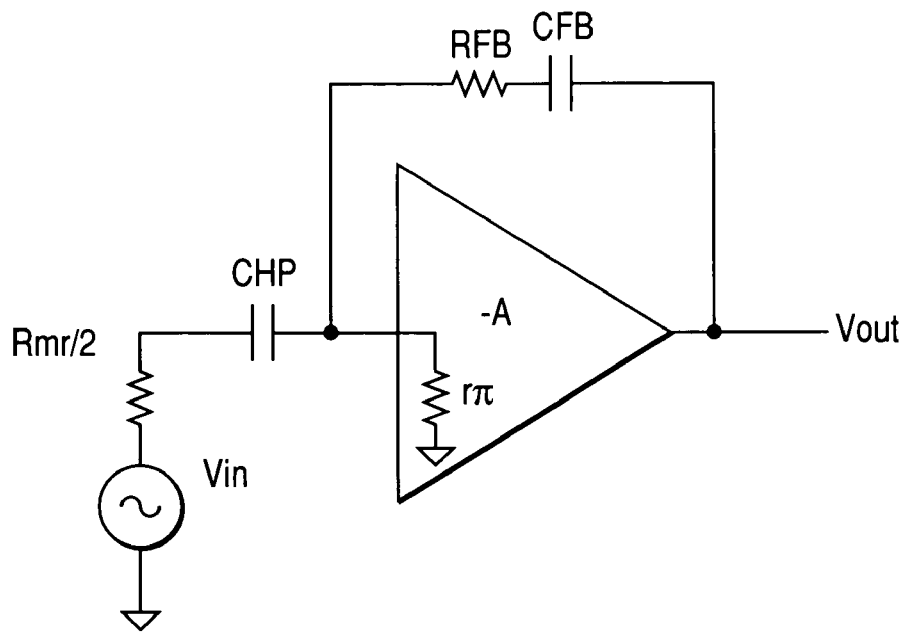
FIG. 12 is a schematic equivalent circuit diagram for describing operations of the preamplifier of FIG. 11.

FIG. 12 is a small signal equivalent circuit diagram for describing operations of the preamplifier of FIG. 11. In FIG. 12, the transfer characteristic H(s) can be obtained as expressed by the formula (5) when the closed loop amplifier gain is defined as −A (inverted output polarity), the feedback capacitances C3, C4 as feedback capacitance CFB, the feedback resistances R3, R4 as feedback resistance RFB, the coupling capacitances C1, C2 as high pass capacitance CHP, and the base input parasitic resistance of the bipolar transistors Q1, Q2 as $r_\pi$. The low frequency gain G1 can be obtained as expressed by the formula (6). The high frequency gain G2 can be obtained as expressed by the formula (7). The high frequency input impedance $Z_{inH}$ can be obtained as expressed by the formula (8). The high-pass cut off frequency fcl can be obtained as expressed by the formula (9). The zero-point frequency (frequency at the gain vs. frequency board diagram wherein a stepped area is generated) fz can be obtained as expressed by the formula (10).

$$H(s) = \frac{s \cdot A \cdot CHP \cdot r\pi \cdot (1 + s \cdot RFB \cdot CFB)}{1 + s \cdot \{(1+A) \cdot CFB + CHP\} - r\pi + s2 \cdot CFB \cdot CHP \cdot r\pi \{(1+A) \cdot Rmr/2 + RFB\}} \quad \text{Formula (5)}$$

$$G1 = \frac{CHP}{(1+A) \cdot CFB + CHP} \cdot A \quad \text{Formula (6)}$$

$$G2 = \frac{A \cdot RFB}{(1+A) \cdot Rmr/2 + RFB} \quad \text{Formula (7)}$$

$$ZinH = \frac{2 \cdot RFB \cdot r\pi}{RFB + r\pi \cdot (1+A)} \quad \text{Formula (8)}$$

$$fcl = \frac{1}{2\pi \cdot \{(1+A) \cdot CFB \cdot CHP\} \cdot r\pi} \quad \text{Formula (9)}$$

$$fZ = \frac{1}{2\pi \cdot RFB \cdot CFB} \quad \text{Formula (10)}$$

Figure 13:
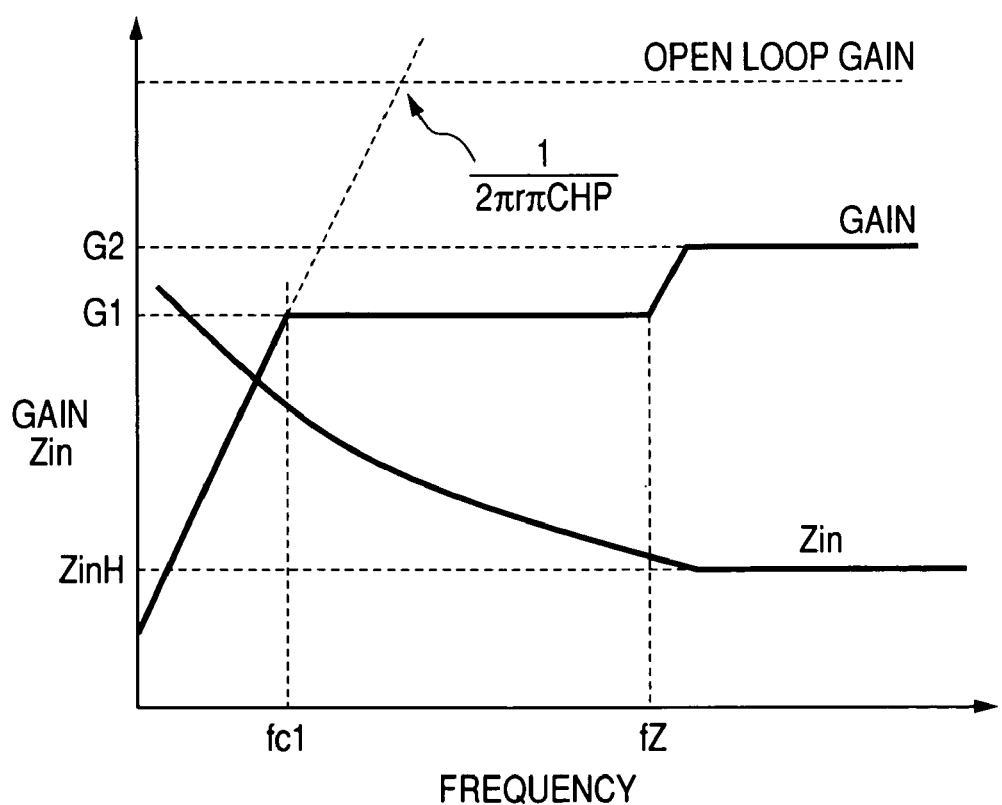
FIG. 13 is a gain-frequency characteristic diagram for describing operations of the preamplifier of FIG. 11.

FIG. 13 illustrates the gain-Frequency characteristic for describing operations of the preamplifier of FIG. 11. In FIG. 11, frequency is plotted on the horizontal axis, while gain on the vertical axis. The high-pass cut off frequency fcl is lowered as much as the effect of the AC feedback than the fcl=1/(2π·rπ·CHP) obtained when the shunt feedback is not applied (in the case of high impedance amplifier) and only small capacitance value is required to realize the a certain constant fcl.

For instance, when $R_{mr}$=50Ω (for instance, in the case of GMR), $r_\pi$=1 kΩ, A=52, and RFB=1.6 kΩ, the practical G2=28, $Z_{inH}$=59Ω can be obtained and impedance matching with the transmission line $Z_0$=60Ω can be attained. In this case, G1 must be set equal to G2 (G1=G2) in the formulae (6) and (7) in order to make flat the Gain-Frequency characteristic of FIG. 13. The CHP and CFB for resulting in G1=G2 and fcl=1 MHz can be obtained as CHP=85 pF, CFB=1Z4 pF with the necessary capacitance of 87 pF×2. Meanwhile, since 159 pF×2 is required from fcl=1/(2π·rπ·CHP) in order to obtain fcl=1 MHz with $r_\pi$=1 kH in the case of the high impedance amplifier, the capacitance value can be reduced to almost a half with the AC feedback in the case of the above numerical values. Moreover, both matching between the input impedance $Z_{in}$ and characteristic impedance $Z_O$ of signal line and reduction of capacitance value can be attained simultaneously.

In this embodiment, the low noise LNA having realized $Z_{in}$ matching has been realized with the AC shunt feedback and moreover since the high-pass capacitance value can be reduced, the chip area of the semiconductor integrated circuit mounting the preamplifier can also be reduced.

In addition, the capacitance value can further be reduced by utilizing the current positive feedback transconductance as illustrated in FIG. 7. Moreover, since the current from the shunt feedback does not compete with the IMR as illustrated in FIG. 1, this embodiment can be applied not only to the head voltage bias system but also to the current bias system.

In addition, since the parasitic capacitance can also be reduced by reducing the built-in capacitance of the semiconductor integrated circuit, broadband characteristic can also be realized. When $Z_{inH}$ is set to 59Ω, an input impedance $Z_{in}$ in the frequency lower than the zero frequency fZ is not matched with the characteristic impedance $Z_O$ of the transmission line as is apparent from the characteristic curve of FIG. 13. However, it does not result in any problem on the actual operation because influence of mismatching in the lower frequency band is negligible.

Since chip area can be reduced through reduction in the capacitance value of built-in capacitance, the cost of the IC including the preamplifier can be lowered. Moreover, since impedance $Z_{in}$ can be realized under the low noise condition, this embodiment can be applied to the TMR head and CPP-GMR head of the next generation in which sensitivity is high but head resistance $R_{mr}$ is not matched with the characteristic impedance $Z_O$ of the transmission line. In addition, the built-in high-pass capacitance must be charged at the time of mode switching between write and read operations. However, in the present invention, since the capacitance value can be reduced, the write-to-read time can be shortened and the idling time of the HDD apparatus can also be reduced.

Figure 14:
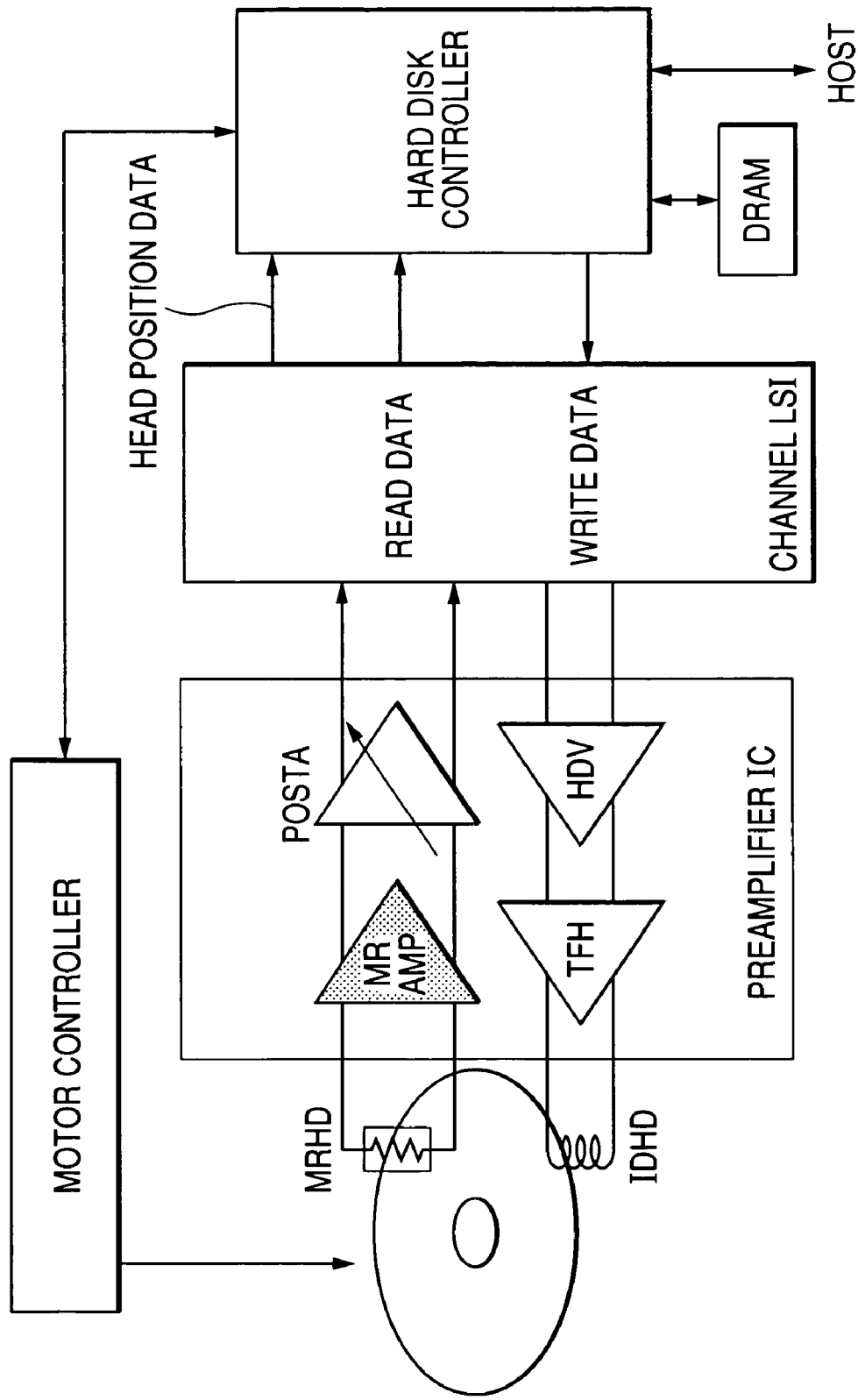
FIG. 14 is a schematic total block diagram of an embodiment of the disk storage system of the present invention.

FIG. 14 is a schematic total block diagram of an embodiment of the disk storage system of the present invention. The disk storage system of this embodiment comprises a preamplifier IC (read/write IC) for sending and receiving the read/write signal to and from the head MRHD for recording and reproducing the data to and from multiple disks having multiple magnetic recording surfaces, a channel LSI (signal processing LSI) for sending and receiving signal to and from the read/write IC, a hard disk controller, a memory DRAM (Dynamic RandomAccess Memory) for storing the write data and read data, and a motor control circuit consisting of a driver for rotatably driving multiple disks having multiple magnetic recording surface and a servo/spindle motor controller.

The preamplifier IC mounts multiple write driver TFH provided corresponding to the inductive head INHD for recording the data to multiple disks and read circuits MRAMP (preamplifiers) provided corresponding to the read head MRHD for reproduction of data. Although not illustrated, various control circuits are also provided with inclusion of a fault detector for detecting fault operations of element and head such as generation of sense current, selection signal, servo circuit and head selection or the like.

Although not related in direct to the present invention, the bias circuit to generate the sense current not illustrated in the figure generates a bias supplied to the read head MRHD and also supplies a bias voltage to the fault detector. A temperature detector detects, although not particularly restricted, large amplitude signal detected when the MR head is in contact with the recording surface and eliminates influence of temperature rise appearing in the output of the preamplifier MRAMP. A pair of output signals of the preamplifier MRAMP are amplified, although not particularly restricted, with a postamplifier POSTA (for example, AGC (automatic gain control) amplifier) having variable gains. An output signal from the postamplifier POSTA is waveform-shaped with a waveform shaping circuit included in the signal processing circuit of the channel LSI. This signal is then converted to the pulse signal with a pulse-forming circuit and is then transferred to the read data to a host circuit such as the HDD controller. The head driver HDV drives the inductive head INHD via the write driver TFH corresponding to the write data when the write mode is set with instruction from the channel LSI.

Figure 15:
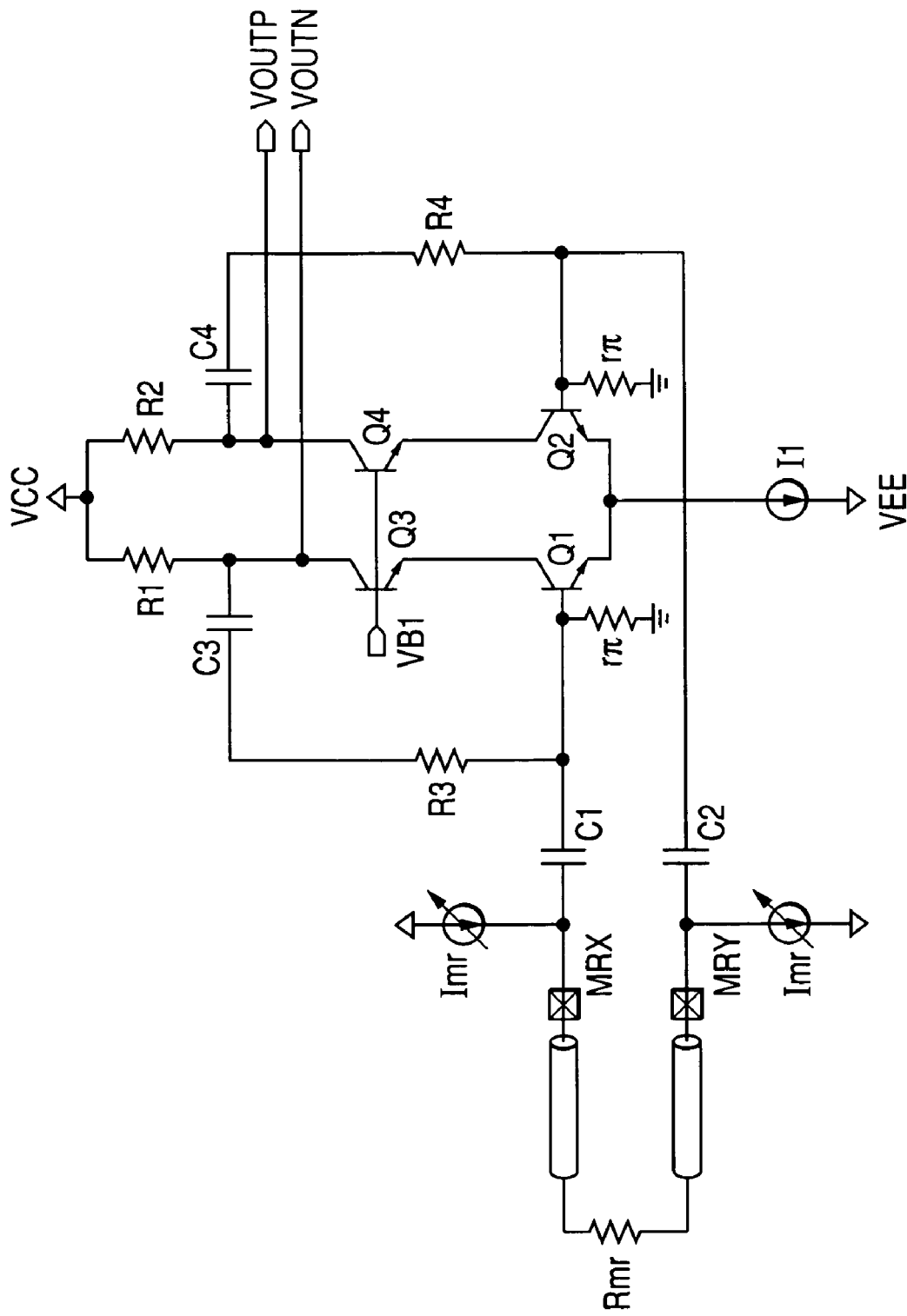
FIG. 15 is a circuit diagram of the other embodiment of the read preamplifier of the disk storage system of the present invention.

FIG. 15 is a circuit diagram of another embodiment of the read preamplifier of the disk storage system of the present invention. In this embodiment, the emitter follower output circuit of feedback path of FIG. 11 is eliminated. The bandwidth characteristic is inferior to that of the embodiment of FIG. 11 but the number of elements (area) can be reduced and thereby power consumption can also be lowered.

Figure 16:
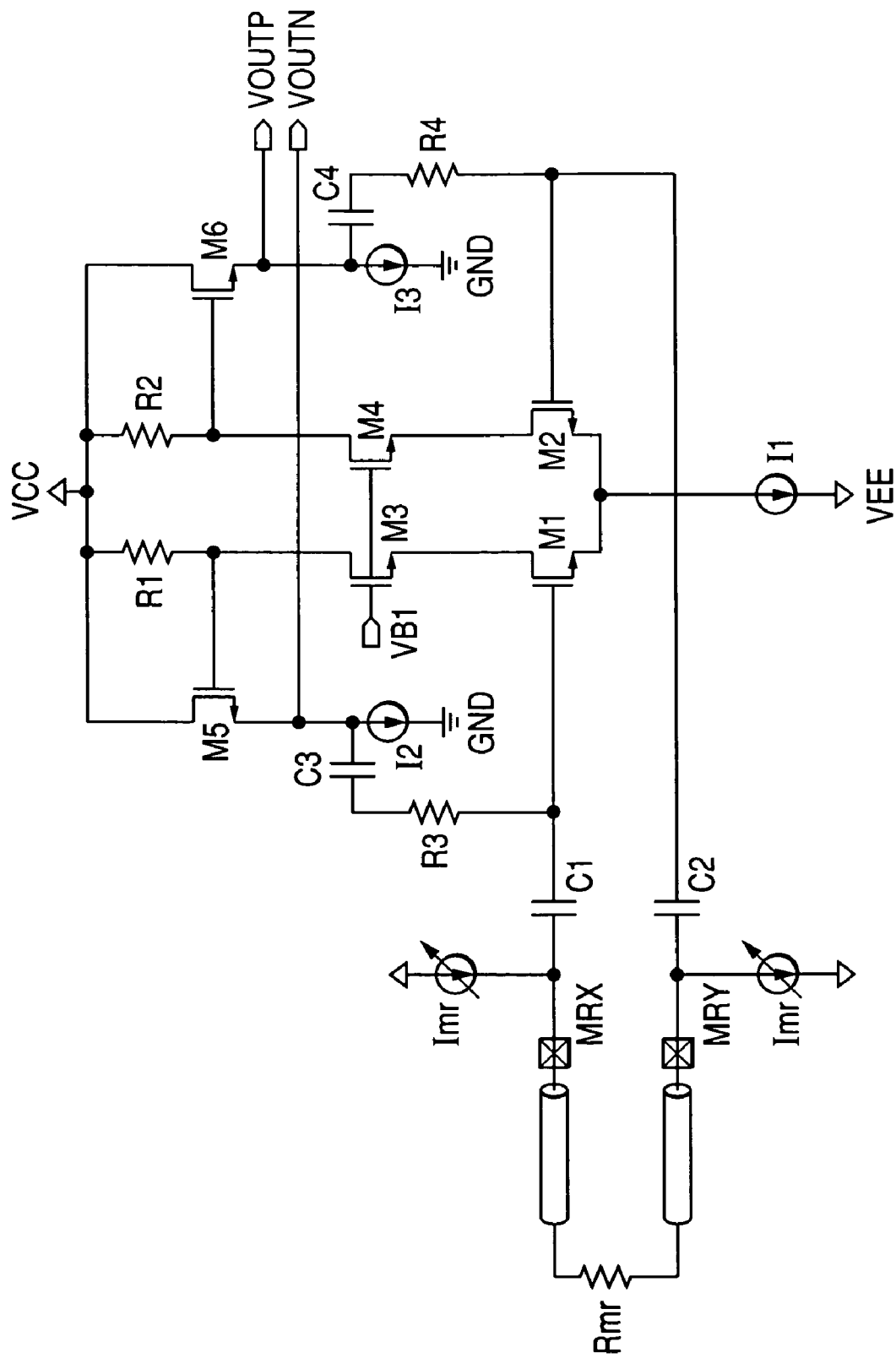
FIG. 16 is a circuit diagram of the other embodiment of the read preamplifier of the disk storage system of the present invention.

FIG. 16 is a circuit diagram of another embodiment of the read preamplifier of the disk storage system of the present invention. In this embodiment, the NPN bipolar transistors Q1 to Q6 of FIG. 11 are replaced with the N-channel MOSFETM1 to M6.

This embodiment has a merit in application into the CMOS process.

Figure 17:
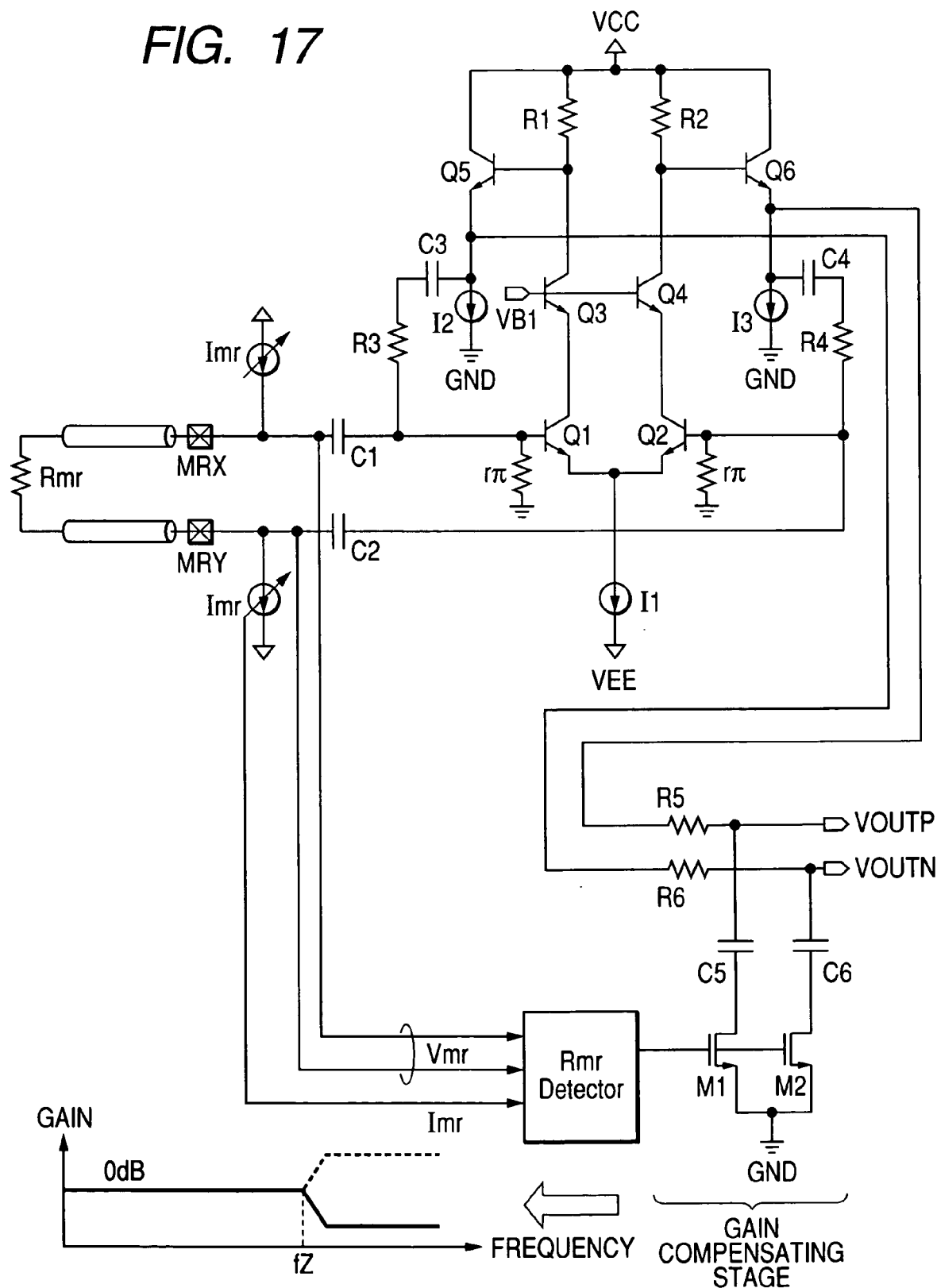
FIG. 17 is a structure diagram of the other embodiment of the read preamplifier of the disk storage system of the present invention.

FIG. 17 is a structure diagram of another embodiment of the read preamplifier of the disk storage system of the present invention. In this embodiment, a gain compensating stage is provided for compensation for variation in the gain due to variation by fluctuation of process of the head resistance Rmr. As described above, when a resistance value of head resistance Rmr is detected, the gain-frequency characteristic of FIG. 13 can be made flat as described above by obtaining the capacitances CHP and CFB to make G1 equal to G2 (G1=G2) in the formulae (6) and (7). However, when the capacitances CHP and CFB are formed in the semiconductor integrated circuit, adjustment of the capacitance values such as CHP, CHF by the trimming or the like is required corresponding to the head resistance $R_{mr}$ of the read head connected. As a result, rise of cost is essential for realization of such adjustment.

In the preamplifier of this embodiment, the low frequency gain does not depend on the head resistance $R_{mr}$ as expressed by the formulae (6) and (7) but high frequency gain depends on the $R_{mr}$. Therefore, if the head resistance $R_{mr}$ fluctuates, the high frequency gain G2 varies and the flat transmission characteristic can no longer be obtained within the frequency band. In order to compensate for such variation and obtain constant gain not depending on the head resistance $R_{mr}$, a high frequency attenuation type gain compensating means is provide in the output side of the preamplifier.

This gain compensating stage attenuates the signal, as indicated by the characteristic curve of the same figure, to provide the low frequency gain G1 of 0 dB and the high frequency gain G2 divided by the resistances R5, R6 and on resistance value rds of the MOSFETM1 and the on resistance value rds of the MOSFETM2. Namely, the on resistance value rds of the MOSFETM1 is proportional to the head resistance $R_{mr}$ when the potential const/$R_{mr}$+$V_{th}$, for example, is generated and it is then applied to the gates of MOSFETM1, M2 by detecting the sense current $I_{mr}$ and bias voltage $V_{mr}$ of the head and then detecting the head resistance $R_{mr}$. Accordingly, the attenuation characteristic indicated by a solid line to cancel the characteristic curve indicated by a dotted line corresponding to variation of head resistance $R_{mr}$ expressed by the formula (7) can be attained to cancel variation in the high frequency gain.

Figure 18:
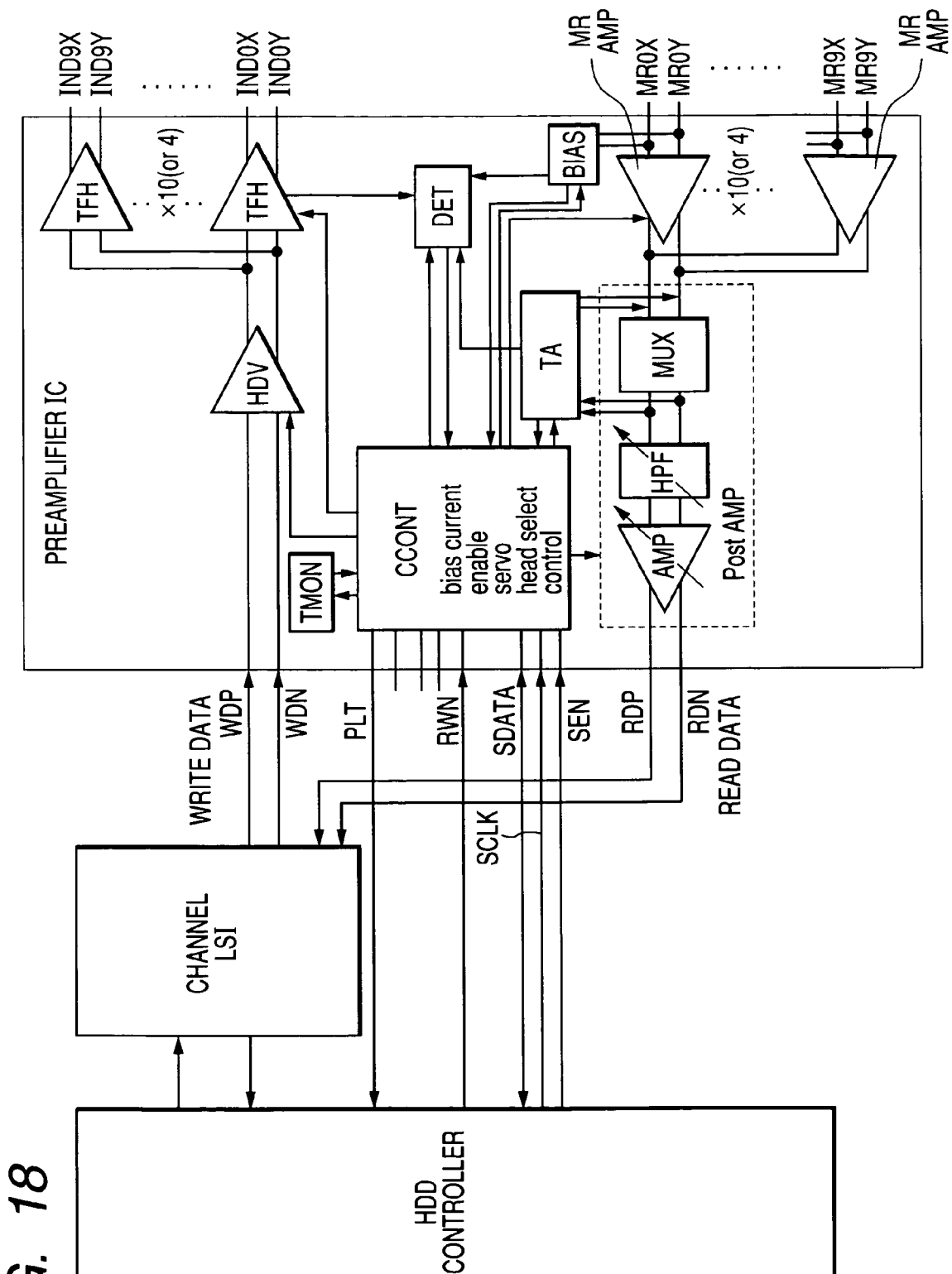
FIG. 18 is a block diagram of the other embodiment of the disk storage system to which the present invention is applied.

FIG. 18 is a block diagram of the other embodiment of the disk storage system of the present invention. The disk storage system of this embodiment is intended to the hard disk drive and comprises a plurality disks as the media, a motor for driving the disks, multiple MR heads for respectively reading the magnetically stored information stored in both surfaces of each disk, multiple read amplifiers MRAMPs provided corresponding to the MR heads, a postamplifier PostAMP, multiple read/write chip including inductive head for write operation and a write driver TFH for driving the inductive head, a read/write channel LSI for sending and receiving signal to and from the read/write chip, and a HDD controller for interface with a host apparatus.

The disk is mounted, although not particularly restricted, to a common rotating shaft which is rotated at its center with the motor and the potential of the storing surfaces of multiple disks is grounded because the ground potential is applied to the rotating shaft. The structure in which one read amplifier, a post amplifier and write driver corresponding to this read amplifier are provided respectively to multiple read/write chips provided corresponding to both surfaces of multiple disks as described above is a mounting profile of the chip as will be described below. That is, the high sensitivity and high frequency band amplifying operation is realized by allocating the read/write chip adjacent to a composite head consisting of the MR head and inductive head IND and then minimizing signal loss when a minute read signal from the MR head is transferred using a comparatively longer signal transmission line.

Multiple disks are concentrically coupled keeping a constant interval. One arm extends to two disk surfaces provided oppositely and the composite heads are respectively placed in contact with both surfaces through the branching with a suspension arm. The head is in contact with the disk surface when the disk is not rotated but it floats keeping a minute gap above the disk surface with the air flow generated when the disk is rotating at higher speed. The read/write operation is conducted under the condition that the head is floated above the disk surface.

As will be described later, the read/write chip is mounted to the end point side of the arm, namely at the mounting part of the suspension arm. Accordingly, the signal lines between the read/write chip and head, in other words, between the MR head and read amplifier and between the inductive head and write driver can be shortened corresponding to the length of suspension arm. The factor for attenuating the signals such as the parasitic resistance of signal line and parasitic inductance element or the like can be minimized to realize high sensitivity and broadband operations.

The HDD control chip for operations such as selection of a head from multiple heads and the read/write channel LSI are mounted to the other end point side of the arm. A comparatively longer distance may be set between the HDD control chip and read/write chip corresponding to the length of arm. But, since the read/write chip exists and its signal element is large, signal loss therein can be neglected.

FIG. 9 is a structure diagram of the essential portion of an embodiment of the disk storage system to which the present invention is applied. The read/write chip is mounted to the root portion of the suspension arm as described above. At the end point of the suspension arm, a composite head consisting of the MR head and inductive head is mounted.

Corresponding to multiple disks, multiple arms and suspension arms are coupled in the laminated condition and a control chip is mounted thereto using the side surface formed by multiple arms. On the other hand, the read/write chip mounting the preamplifier is mounted to the mounting part of the suspension arm and thereby the signal line to the head can be shortened. With employment of such mounting profile of the read/write chip and control chip, high sensitive and wideband read operation and reduction in size of the hard disk apparatus can be realized by minimizing loss in the signal transmission line as described above.

According to this embodiment, a low noise preamplifier can be realized to implement impedance matching for the input impedances of the signal line and differential amplifying circuit using the capacitance elements which may be comprised within the IC. Use of such preamplifier realizes reduction in size of the HDD apparatus.

The present invention has been described practically on the basis of the preferred embodiments thereof but the present invention is never limited thereto and allows various changes and modifications within the scope of the subject matter. For example, the practical structure of the gain compensating stage of FIG. 17 is capable of introducing various profiles, for example, a profile in which the control signal consisting of multiple bits are supplied from an external terminal and attenuation amount is set in accordance with the head resistance by controlling a variable resistance circuit formed in the semiconductor integrated circuit. The read/write chip of FIG. 9 is enough when it is mounting at least the preamplifier MAAMP and driver TFH. This invention can be applied to the amplifier circuit which requires high-pass frequency characteristic, wideband, and low noise such as the read/write preamplifier IC for HDD and particularly to the amplifier which is required to comprise the capacitances for high-pass frequency.

What is claimed is:

1. A hard disk drive system comprising:
   a read head;
   a signal line connected at one end thereof respectively to both ends of the read head; and
   an amplifying circuit which is connected to the other end of the signal line to amplify and output a read signal formed by the read head,
   wherein the amplifying circuit comprising:
   a head bias circuit connected electrically to the other end of the signal line to apply a sense current to the read head;
   a first and a second capacitance elements connected electrically with the other end of the signal line to allow a signal element of the read signal formed by the read head to pass;
   a differential amplifying element for receiving at an input terminal thereof the read signal having passed the first and second capacitance elements;
   a transconductor for converting the read signal amplified with the differential amplifying element into a current; and a positive feedback loop for feeding back the read signal converted to the current with the transconductor to the input terminal of the differential amplifying element.

2. The hard disk drive system according to claim 1, wherein the amplifying circuit is integrated to a single semiconductor integrated circuit chip.

3. The hard disk drive system according to claim 1, wherein high-pass cut off frequency of the amplifying circuit is shifted toward a lower frequency side with a current mode positive feedback by the transconductor.

4. The hard disk drive system according to claim 3, wherein the transconductor comprises seventh and eighth emitter coupled bipolar transistors,
wherein collectors of the seventh and eighth bipolar transistors are respectively connected with current sources, and
wherein a common emitter of the seventh and eighth bipolar transistors is connected with a current source.

5. The hard disk drive system according to claim 4, wherein the current source connected to the common emitter applies a base current of the bipolar transistor which is connected to the common emitter at the base thereof and is biased with a predetermined collector current.

6. The hard disk drive system according to claim 3, wherein the transconductor comprises first and second source coupled MOSFETs of a first conductivity type,
wherein the first and second MOSFETs of the first conductivity type are respectively connected with current source, and
wherein a common source of the first and second MOSFETs of the first conductivity type is connected with a current source.

7. The hard disk drive system according to claim 3, wherein the transconductor comprises seventh and eighth emitter coupled PNP bipolar transistors, and
wherein a common emitter of the seventh and eighth PNP bipolar transistors is connected with a current source.

8. The hard disk drive system according to claim 3, wherein the transconductor comprises first and second source coupled MOSFETs of a second conductivity type, and
wherein a common source of the first and second MOSFETs of the second conductivity type is connected with a current source.

9. The hard disk drive system according to claim 1, wherein the differential amplifying element comprises first and second emitter-coupled bipolar transistors,
wherein collectors of the first and second bipolar transistors are respectively connected electrically with first and second load resistance elements, and
wherein common emitters of the first and second bipolar transistors are connected with current sources.

10. The hard disk drive system according to claim 9, wherein emitter follower circuits of third and fourth bipolar transistors and a serial circuit including third and fourth resistance elements are electrically connected between the collectors of the first and second bipolar transistors and a terminal in the read head side of the first and second capacitance elements.

11. The hard disk drive system according to claim 9, wherein emitter follower circuits of third and fourth bipolar transistors and a serial circuit including third and fourth resistance elements and third and fourth capacitance elements are provided between the collectors and bases of the second bipolar transistors.

12. The hard disk drive system according to claim 9, wherein fifth and sixth bipolar transistors in which a bias voltage is supplied to bases are respectively connected in series between the collectors of the first and second bipolar transistors and the first and second load resistance elements.

13. A hard disk drive system comprising:
a read head;
a first signal line respectively connected to both ends of the read head;
a write head;
a second signal line respectively connected to both ends of the write head;
an amplifying circuit connected to an other end of the first signal line to amplify and output a read signal formed by the read head; and
a write driver connected to an other end of the second signal line to output a write signal to the write head,
wherein the amplifying circuit comprising:
a head bias circuit electrically connected to the other end of the first signal line to apply a sense current to the read head;
first and second capacitance elements connected electrically to the other end of the first signal line to allow a signal element of the read signal formed by the read head to pass;
a differential amplifying element for receiving the read signal having passed the first and second capacitance elements at an input terminal;
a transconductor for converting the read signal amplified with the differential amplifying element to a current; and
a positive feedback loop for feeding back the read signal converted to the current with the transconductor to the input terminal of the differential amplifying element.

14. The hard disk drive system according to claim 13, wherein the amplifying circuit and write driver are integrated into a single semiconductor intregrated circuit.

15. The hard disk drive system according to claim 14, further comprising:
a post amplifier connected to an output terminal of the amplifying circuit to input and amplify the read signal outputted from the amplifying circuit and to output the amplified read signal; and
a PECL (Pseudo Emitter Coupled Logic) driver connected to an input terminal of the write driver to output the write signal for driving the write head via the write driver,
wherein at least one of the post amplifier and head driver is integrated into a single semiconductor integrated circuit together with the amplifying circuit and write driver.

16. The hard disk drive system according to claim 15, further comprising:
a read/write channel LSI connected to the output terminal of the postamplifier and to an input terminal of a head driver to input the read signal from the postamplifier and to output the write signal to the head driver; and
a hard disk controller for inputting the read signal from the read/write channel LSI and also outputting the write signal thereto.

* * * * *